United States Patent [19]

Kuznicki et al.

[11] Patent Number: 5,311,516
[45] Date of Patent: May 10, 1994

[54] PAGING SYSTEM USING MESSAGE FRAGMENTATION TO REDISTRIBUTE TRAFFIC

[75] Inventors: William J. Kuznicki, Coral Springs; David F. Willard, Plantation, both of Fla.

[73] Assignee: Motorola, Inc., Schaumburg, Ill.

[21] Appl. No.: 980,084

[22] Filed: Nov. 23, 1992

Related U.S. Application Data

[63] Continuation-in-part of Ser. No. 891,503, May 29, 1992.

[51] Int. Cl.[5] ............................. H04J 3/24; H04Q 7/00
[52] U.S. Cl. .................................. 370/94.1; 370/95.1; 370/110.1; 340/825.07; 340/825.44; 379/57
[58] Field of Search ............ 370/79, 82, 84, 94.1, 370/94.2, 95.1, 95.2, 95.3, 110.1; 340/825.06, 825.07, 825.44, 825.47, 825.48, 825.52; 379/57, 58, 59, 63; 455/38.1, 38.5

[56] References Cited

U.S. PATENT DOCUMENTS

| | | | |
|---|---|---|---|
| 4,642,632 | 2/1987 | Ohyagi et al. | 340/825.44 |
| 4,668,949 | 5/1987 | Akahori et al. | 340/825.47 |
| 4,706,272 | 11/1987 | Nishimura et al. | 379/57 |
| 4,713,808 | 12/1987 | Gaskill et al. | 370/94.1 |
| 4,885,577 | 12/1989 | Nelson | 340/825.44 |
| 4,965,569 | 10/1990 | Bennett et al. | 340/825.44 |
| 5,212,721 | 5/1993 | DeLuca et al. | 379/57 |

FOREIGN PATENT DOCUMENTS 57-11044A 3/1982 Japan.
57-41015A 3/1982 Japan.
88-05248 7/1988 World Int. Prop. O. .

OTHER PUBLICATIONS

European Telecommunication Standard, ETS 300 133 Jul. 4, 1992, "Paging Systems (PS); European Radio Message System (ERMES) Part 4: Aie interface specification", reference: DE/PS-2001-2004.

Primary Examiner—Douglas W. Olms
Assistant Examiner—Alpus H. Hsu
Attorney, Agent, or Firm—Philip P. Macnak; Thomas G. Berry; Daniel R. Collopy

[57] ABSTRACT

A selective call receiver (106) receives one or more message packets of a transmitted fragmented message, where each of the one or more message packets includes an address (1605) and message data (1610), and the message data (1610) includes an indication (1702) of whether more message packets are to be received for the fragmented message. The selective call receiver (106) receives an address of each message packet, and then correlates (2908) the address to one or more predetermined addresses. After a successful correlation (2908), the selective call receiver (106) decodes the message data (1610) of each message packet, and then successively stores (2928, 2936, 2942) the decoded message data (1610) to reconstruct the fragmented message. The selective call receiver (106) determines that the fragmented message is completely reconstructed after detection (2918) in the decoded message data (1610) an indication (1702) that no more message packets are to be received for the fragmented message.

22 Claims, 22 Drawing Sheets

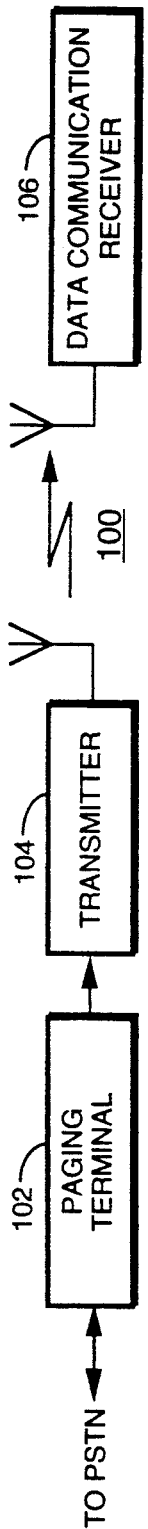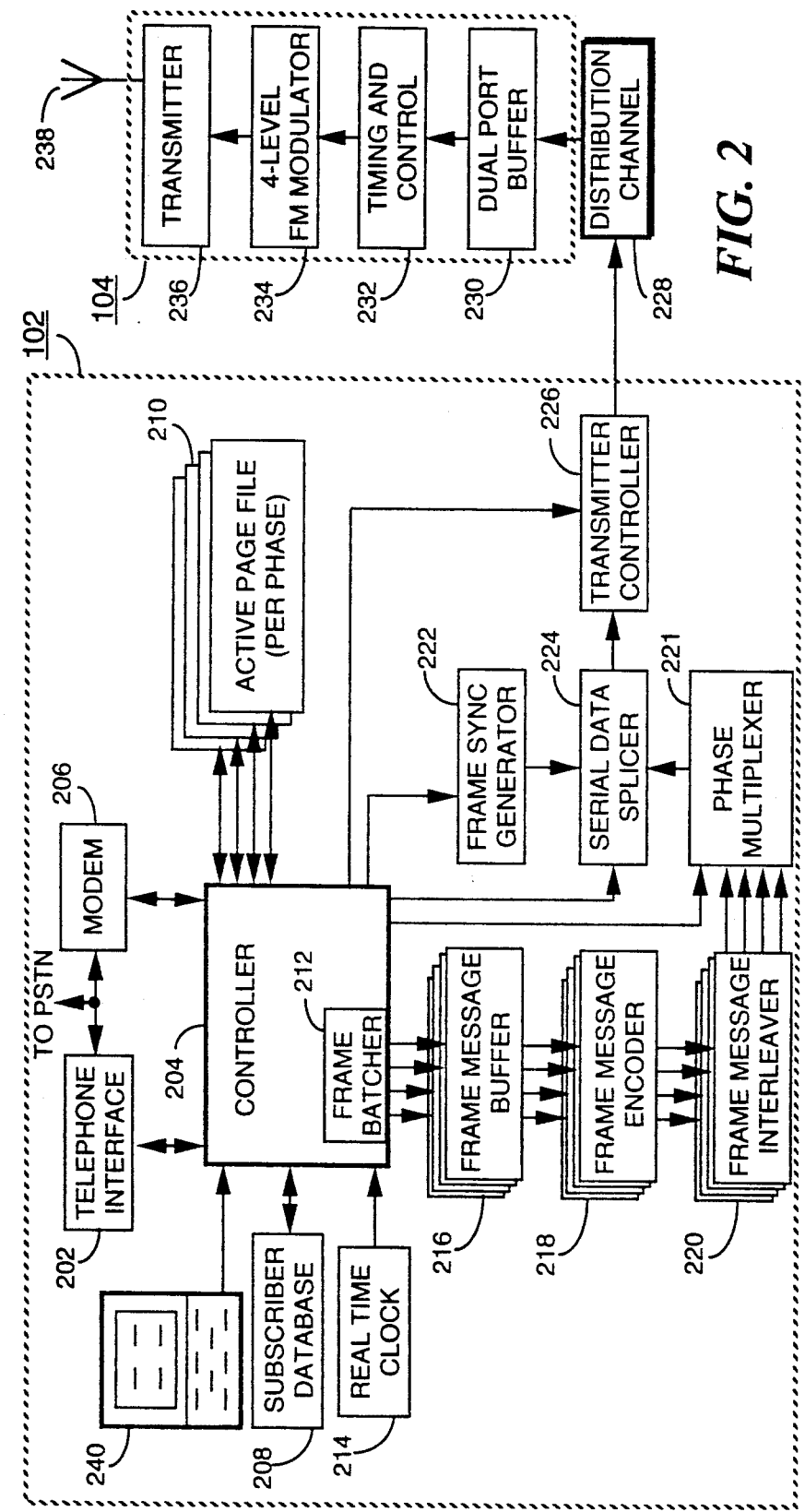

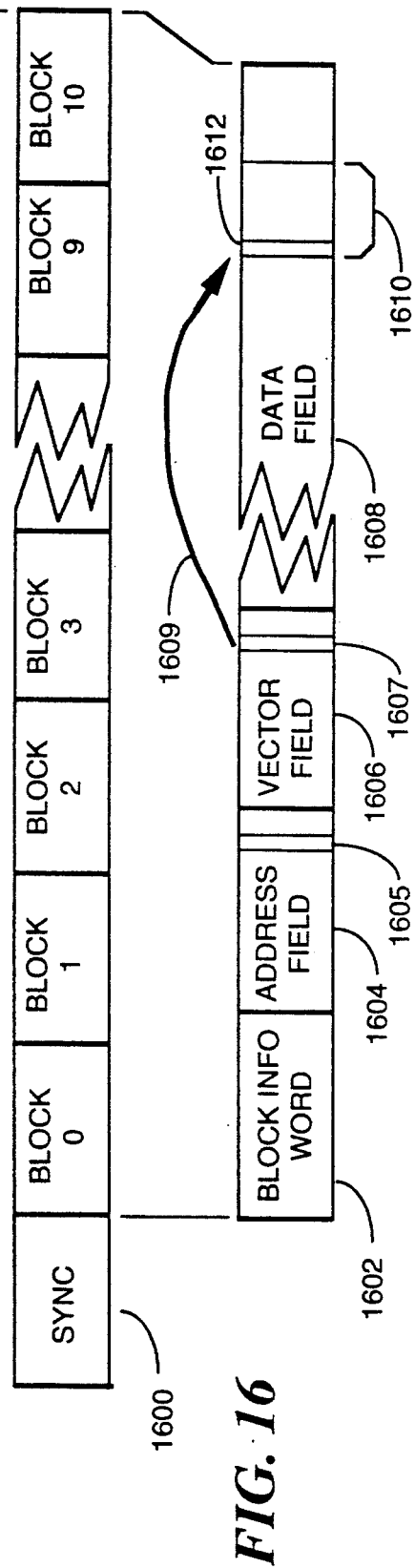
*FIG. 16*
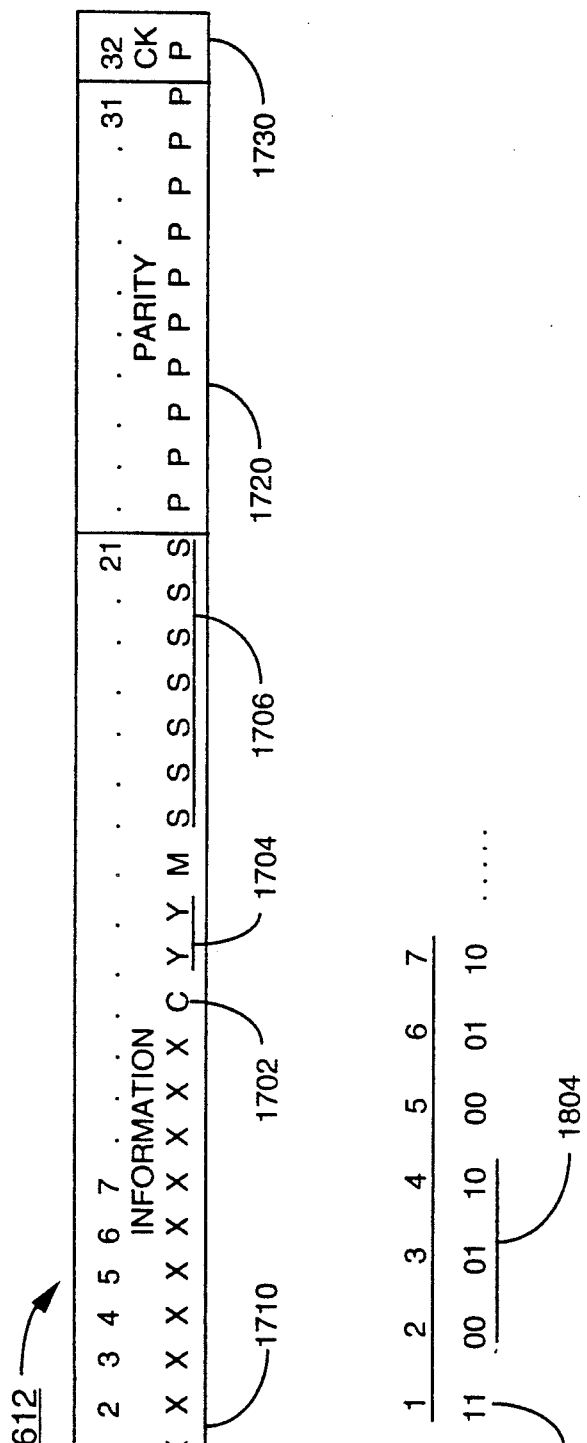
*FIG. 17*
*FIG. 18*

*FIG. 23*

PAGING SYSTEM USING MESSAGE FRAGMENTATION TO REDISTRIBUTE TRAFFIC

This is a continuation-in-part of U.S. patent application Ser. No. 07/891,503, filed May 29, 1992 by Kuznicki et al., entitled "Data Communication Terminal Providing Variable Length Message Carry-On".

CROSS REFERENCE TO RELATED, COPENDING APPLICATION

A related, copending application is U.S. patent application Ser. No. 07/891,363filed May 29, 1992 by Schwendeman et al., and assigned to the assignee hereof, entitled "Data Communication Receiver Having Variable Length Message Carry-On".

1. Field of the Invention

The present invention relates generally to the field of addressed messaging communication systems, and more particularly to a message segmentation method for redistributing traffic over time slots in a communication protocol.

2. Background of the Invention

Communication systems, such as paging systems, have been increasing the length of their transmitted messages. Further, the trend in the marketplace is toward transmitting very long messages in certain applications, such as information distribution services. Well known paging signaling protocols, such as the POCSAG signaling protocol, have provided a satisfactory level of performance for short message data transmission. However, when messages get very long the communication channel access can be blocked for very long time intervals. Also, errors due to fading and other transmission phenomena can be more likely to occur in long transmitted messages. Additionally, if callers to the paging system do not receive a confirmation from recipients of the transmitted messages within a reasonably short time, then the callers tend to call again and send duplicate messages to the same recipients. Consequently, this adds to the overall traffic in the system and increases the frustration of the users of the system. This bottleneck can add significant time delay to all other communication in the system. Long time delays, i.e., communication system latency, from the time a message is entered into the system to the time the message is received by a user of a communication receiver can be at the very least a significant inconvenience to the user. If an emergency message is significantly delayed, such as in a governmental or medical communication, the result may have serious consequences for a community.

Thus, there is a need for providing a communication protocol which uses message fragmentation to redistribute traffic in a communication system, such as a paging system.

SUMMARY OF THE INVENTION

According to an embodiment of the present invention, there is provided a method for decoding a transmitted fragmented message in a selective call receiver. The fragmented message comprises one or more message packets, each of the one or more message packets comprises an address and message data, the message data comprises an indication of whether more message packets are to be received for the fragmented message. The selective call receiver receives an address of each message packet of one or more message packets of a fragmented message, and then correlates the address to one or more predetermined addresses. The selective call receiver decodes the message data of each message packet in response to a successful correlation of the address, and then successively stores the decoded message data of each message packet of the one or more message packets to reconstruct the fragmented message. The selective call receiver determines that the fragmented message is completely reconstructed after detection in the decoded message data of one of the one or more message packets an indication that no more message packets are to be received for the fragmented message.

BRIEF DESCRIPTION OF THE DRAWINGS

FIG. 1 is an electrical block diagram of a data transmission system in accordance with the preferred embodiment of the present invention.

FIG. 2 is an electrical block diagram of a terminal for processing and transmitting message information in accordance with the preferred embodiment of the present invention.

FIG. 16 is a timing diagram illustrating the organization of the transmission frame utilized in accordance with the preferred embodiment of the present invention.

FIG. 17 is a timing diagram illustrating the transmission format of the first data code word in the data portion of a message in accordance with the preferred embodiment of the present invention.

FIG. 18 is a timing diagram illustrating a sequence of packet numbers for a transmitted message using a message fragmentation method in accordance with the preferred embodiment of the present invention.

FIGS. 23, 24, and 25 are three additional symbolic representations of messages being processed by the frame batcher of FIG. 20, in accordance with the preferred embodiment of the present invention.

DESCRIPTION OF THE PREFERRED EMBODIMENTS

Figure 3:
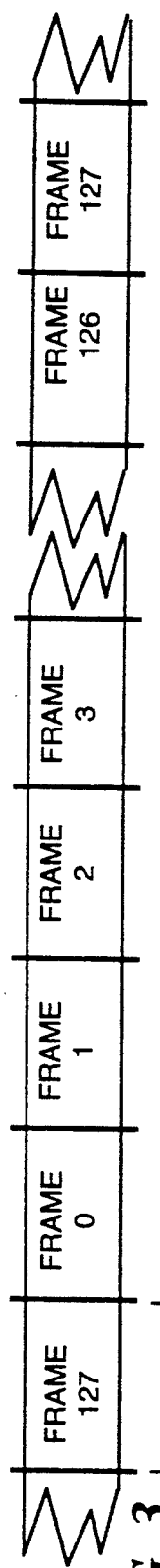
FIGS. 3 to 5 are timing diagrams illustrating the transmission format of the signaling protocol utilized in accordance with the preferred embodiment of the present invention.

FIG. 1 is an electrical block diagram of a data transmission system 100, such as a paging system, in accordance with the preferred embodiment of the present invention. In such a data transmission system 100, messages originating either from a telephone, e.g., a dual-tone-multi-frequency (DTMF) telephone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104 preferably simulcast transmit the message information to data communication receivers, e.g., selective call receivers 106. Processing of the numeric and alphanumeric information by the paging terminal 102, and the protocol utilized for the transmission of the messages is described below.

FIG. 2 is an electrical block diagram of the paging terminal 102 utilized for processing and controlling the transmission of the message information in accordance with the preferred embodiment of the present invention. Tone-only and numeric messages, which can be readily entered using a DTMF telephone, are coupled to the paging terminal 102 through a telephone interface 202 in a manner well known in the art. Alphanumeric messages, which typically require the use of a data entry device, are coupled to the paging terminal 102 through a modem 206 using any of a number of well known modem transmission protocols.

When a call to place a message, i.e., a paging request, is received, a controller 204 handles the processing of the message. The controller 204 is preferably a microcomputer, such as one based on the MC68000 family, which is manufactured by Motorola Inc., or the equivalent. The controller 204 runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber data base 208 includes, but is not limited to such information as addresses assigned to the data communication receiver, message type associated with the address, and information related to the status of the data communication receiver, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber database 208 also includes such information as to what transmission frame and to what transmission phase the data communication receiver is assigned, as will be described in further detail below. The received message is stored in an active page file 210 which stores the messages in queues according to the transmission phase assigned to the data communication receiver 106. In the preferred embodiment of the present invention, four phase queues are provided in the active page file 210. The active page file 210 is preferably a dual port, first-in-first-out random access memory, although it will be appreciated that other random access memory devices, such as hard disk drives, can be utilized as well.

Periodically the message information stored in each of the phase queues is recovered from the active page file 210 under control of the controller 204 using timing information such as provided by a real time clock 214, or other suitable timing source. The recovered message information from each phase queue is sorted by frame number and is then organized by address, message information, and any other information required for transmission, and then batched into frames by frame batching controller (frame batcher) 212. The selection of frames by the frame batching controller 212 can be based upon message size, and optionally based upon other parameters that will be discussed below.

Because every frame is of a predetermined length, sometimes not all message information from the active page file 210 can be transmitted in the current frame, e.g., the current time slot. For example, if one or more messages are longer than can fit in the current frame, then the frame batcher 212 optionally can fragment the long messages into one or more message packets for transmission over one or more frames, e.g., time slots, which may be allocated over one or more phases, as will be more fully discussed below. The frame batcher 212 can temporarily hold at least a portion of the messages that are destined for transmission over multiple frames in this fashion. The process of generating fragmented messages and transmitting them to a receiving communication receiver will be discussed below.

Preferably, any priority addresses are located as the very first addresses in the batched frame information for sending them out first with the very next transmitted frame. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame message encoder 218, again maintaining the phase queue relationship.

The frame encoder 218 encodes the address and message information into address and message code words required for transmission, as will be described below. The encoded address and message code words are ordered into blocks and then coupled to a frame message interleaver 220 which interleaves preferably eight code words at a time for transmission in a manner well known in the art. The interleaved code words from each frame message interleaver 220 are then serially transferred to a phase multiplexer 221, which multiplexes the message information on a bit by bit basis into a serial data stream by transmission phase.

The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system 100.

The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

Figure 4:
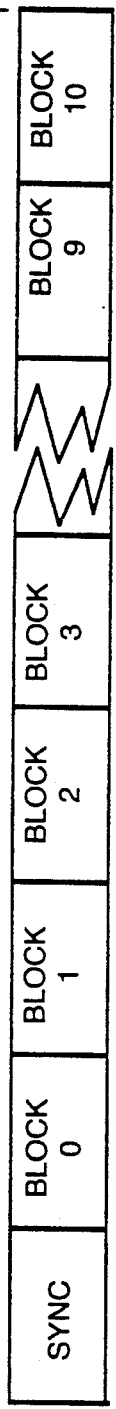
Figure 5:
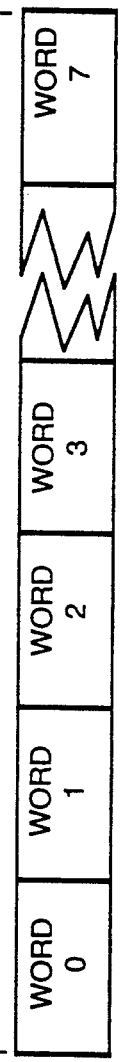

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers, such as pagers, assigned to one or more of 128 frames which are labeled frame 0 through frame 127. It then will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

As shown in FIG. 4, the frames comprise a synchronization code (sync) followed preferably by eleven blocks of message information which are labeled block 0 through block 10. As shown in FIG. 5. Each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word could be utilized as well. Unlike the well known POCSAG signaling protocol which provides address and data code words which utilize the first code word bit to define the code word type, as either address or data, no such distinction is provided for the address and data code words in the signaling protocol utilized with the preferred embodiment of the present invention. Rather, address and data code words are defined by their position within the individual frames, as will be more fully discussed below.

Figure 6:
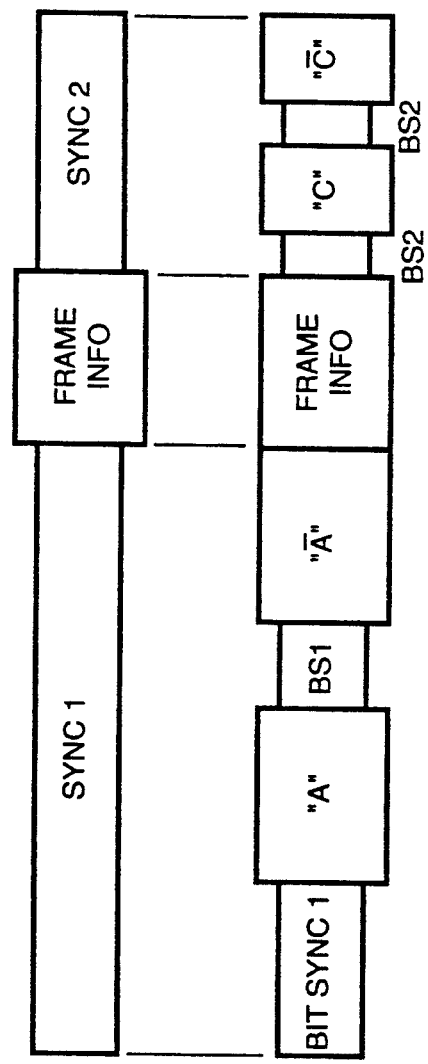
FIGS. 6 and 7 are timing diagrams illustrating the synchronization signals utilized in accordance with the preferred embodiment of the present invention.
Figure 7:
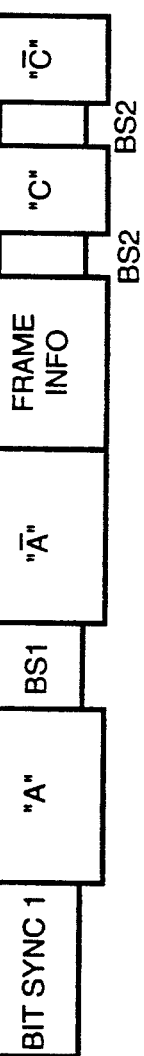

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information code word (frame info) and a second synchronization code (sync 2). As shown in FIG. 7, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
| --- | --- |
| 1600 bps | A1 and A1 bar |
| 3200 bps | A2 and A2 bar |
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization at the frame transmission data bit rate.

In summary the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver 106 with the data code words transmitted at the various transmission rates.

Figure 8:
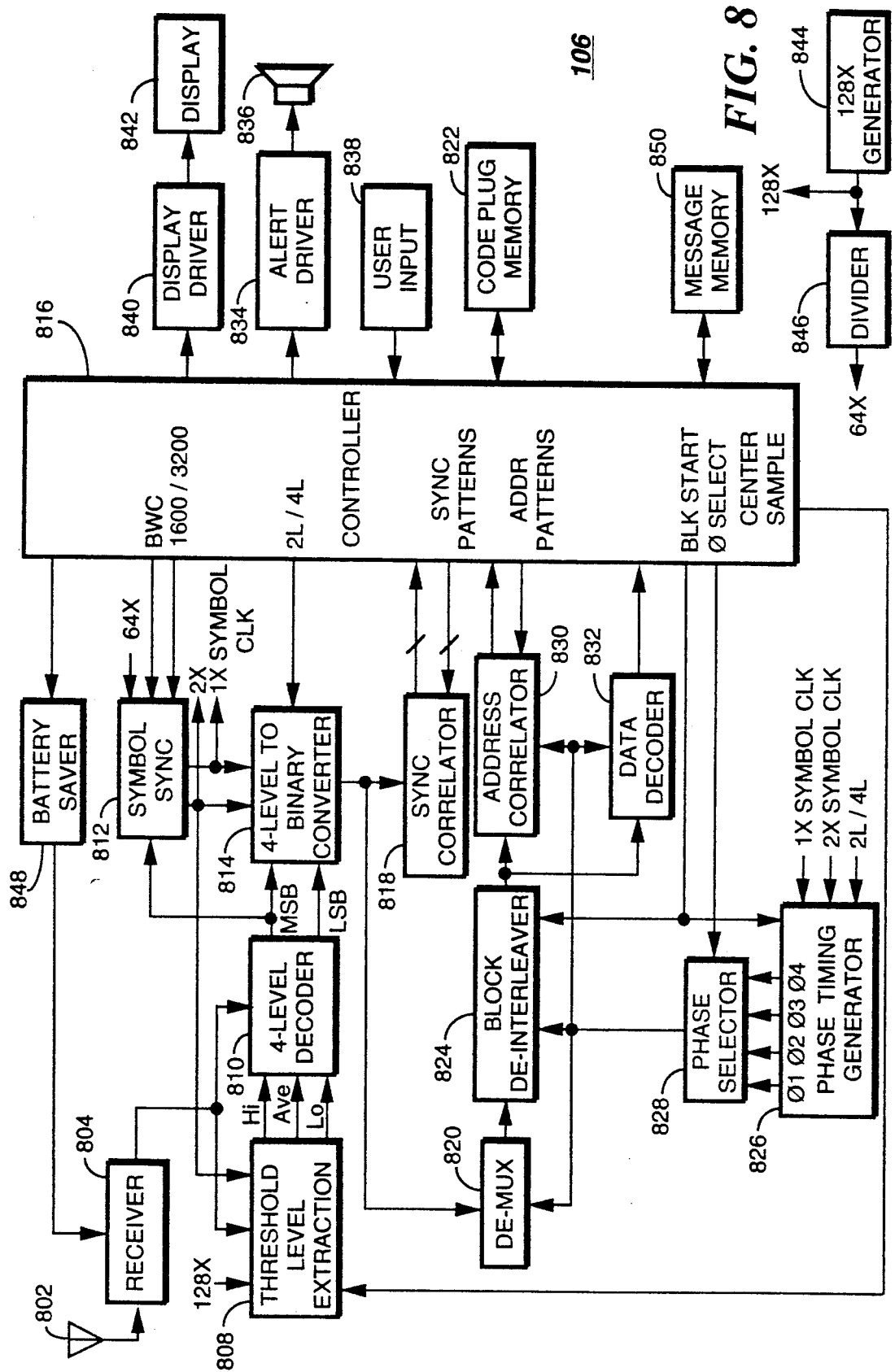
FIG. 8 is an electrical block diagram of a data communication receiver in accordance with the preferred embodiment of the present invention.

FIG. 8 is an electrical block diagram of the data communication receiver, e.g., the selective call receiver 106, in accordance with the preferred embodiment of the present invention. The heart of the data communication receiver 106 is a controller 816, which is preferably implemented using an MC68HC05HC11 microcomputer, such as manufactured by Motorola, Inc., or an equivalent microcomputer. The microcomputer controller, hereinafter called the controller 816, receives and processes inputs from a number of peripheral circuits, as shown in FIG. 8, and controls the operation and interaction of the peripheral circuits using software routines. The general use of a microcomputer controller for processing and control functions is well known to one of ordinary skill in the art.

The data communication receiver 106 is capable of receiving address, control and message information, hereinafter called "data", which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereinafter called a recovered data signal. The recovered data signal is coupled to one input of a threshold level extraction circuit 808, and to an input of a 4-level decoder 810.

Figure 9:
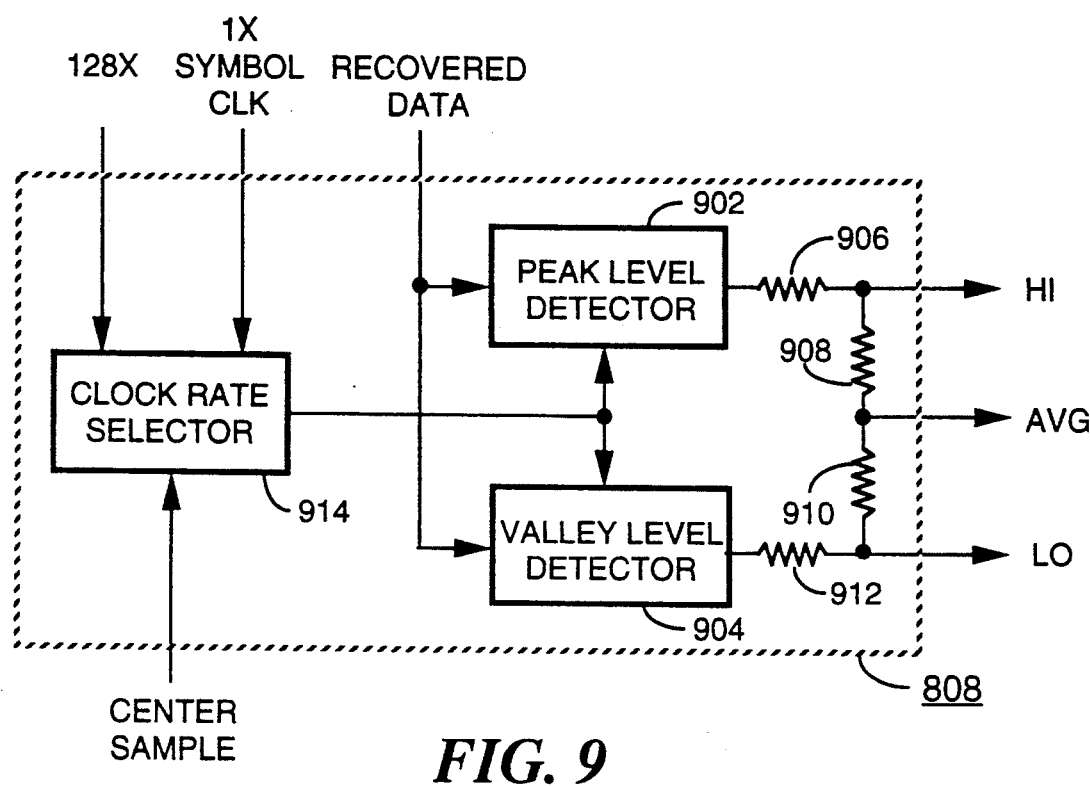
FIG. 9 is an electrical block diagram of a threshold level extraction circuit utilized in the data communication receiver of FIG. 8.

The threshold level extraction circuit 808 is best understood by referring to FIG. 9, and as shown comprises two clocked level detector circuits 902, 904 which have as inputs the recovered data signal. A first level detector 902 detects the peak signal amplitude value and provides a high peak threshold signal which is proportional to the detected peak signal amplitude value. A second level detector 904 detects the valley signal amplitude value and provides a valley threshold signal which is proportional to the detected valley signal amplitude value of the recovered data signal. The first and second level detector 902, 904 signal outputs are coupled to terminals of resistors 906, 912, respectively. The opposite resistor terminals 906, 912 provide the high threshold output signal (Hi), and the low threshold output signal (Lo), respectively. The opposite resistor terminals 906, 912 are also coupled to terminals of two resistors 908, 910, respectively. The opposite terminals of the two resistors 908, 910 are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver 106 is first turned on, a clock rate selector 914 is preset through a control input (center sample) to select a 128X clock, i.e. a clock having a frequency equivalent to 128 times the slowest data bit rate, which as described above is 1600 bps. The 128X clock is generated by 128X clock generator 844, as shown in FIG. 8, which is preferably a crystal controlled oscillator operating at 204.8 KHz (kilohertz). The output of the 128X clock generator 844 couples to an input of frequency divider 846 which divides the output frequency by two to generate a 64X clock at 102.4 KHz. Returning to FIG. 9, the 128X clock allows the level detectors 902, 904 to asynchronously detect in a very short period of time the peak and valley signal amplitude values, and to therefore generate the low (Lo), average (Avg), and high (Hi) threshold output signal values required for modulation decoding. After symbol synchronization is achieved with the synchronization signal, as will be described below, the controller 816 generates a second control signal (Center Sample) to enable selection of a 1X symbol clock which is generated by symbol synchronizer 812 as shown in FIG. 8.

Figure 10:
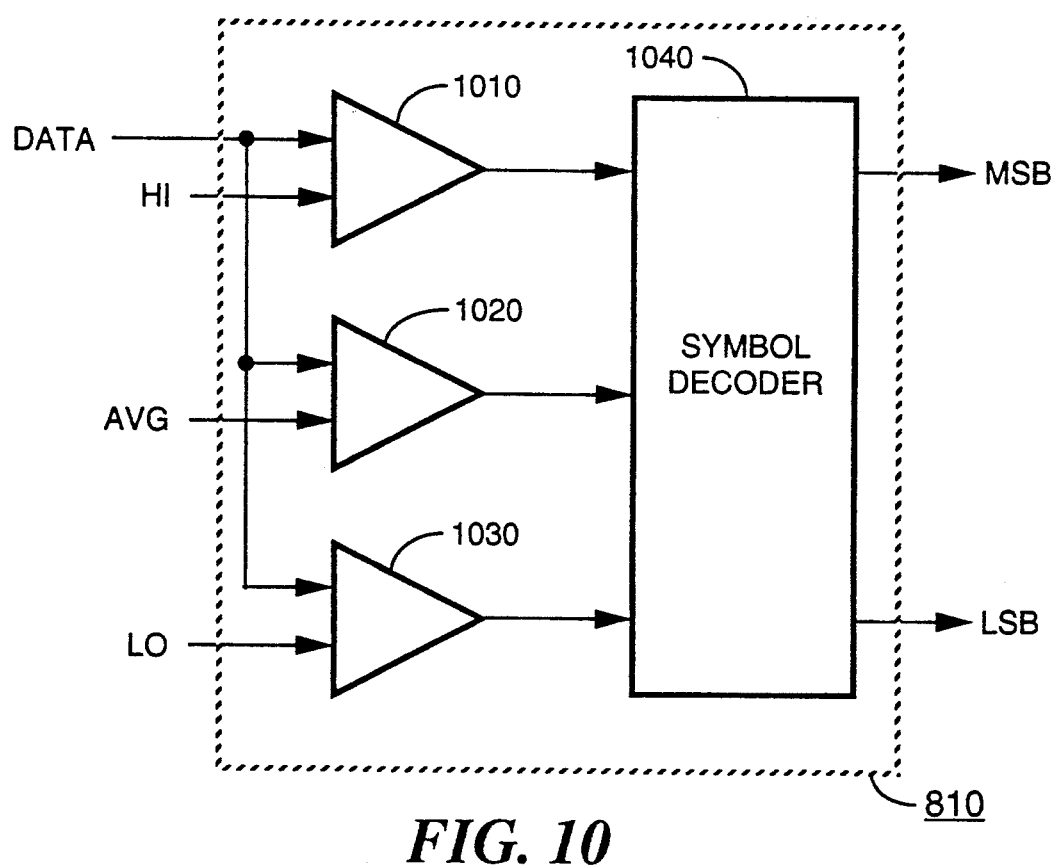
FIG. 10 is an electrical block diagram of a 4-level decoder utilized in the data communication receiver of FIG. 8.

Returning to FIG. 8, the 4-level decoder 810 operation is best understood by referring to FIG. 10. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| Threshold | | | Output | |
| --- | --- | --- | --- | --- |
| Hi | Avg | Lo | MSB | LSB |
| $RC_{in} <$ | $RC_{in} <$ | $RC_{in} <$ | 0 | 0 |
| $RC_{in} <$ | $RC_{in} <$ | $RC_{in} >$ | 0 | 1 |
| $RC_{in} <$ | $RC_{in} >$ | $RC_{in} >$ | 1 | 1 |
| $RC_{in} >$ | $RC_{in} >$ | $RC_{in} >$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 11:
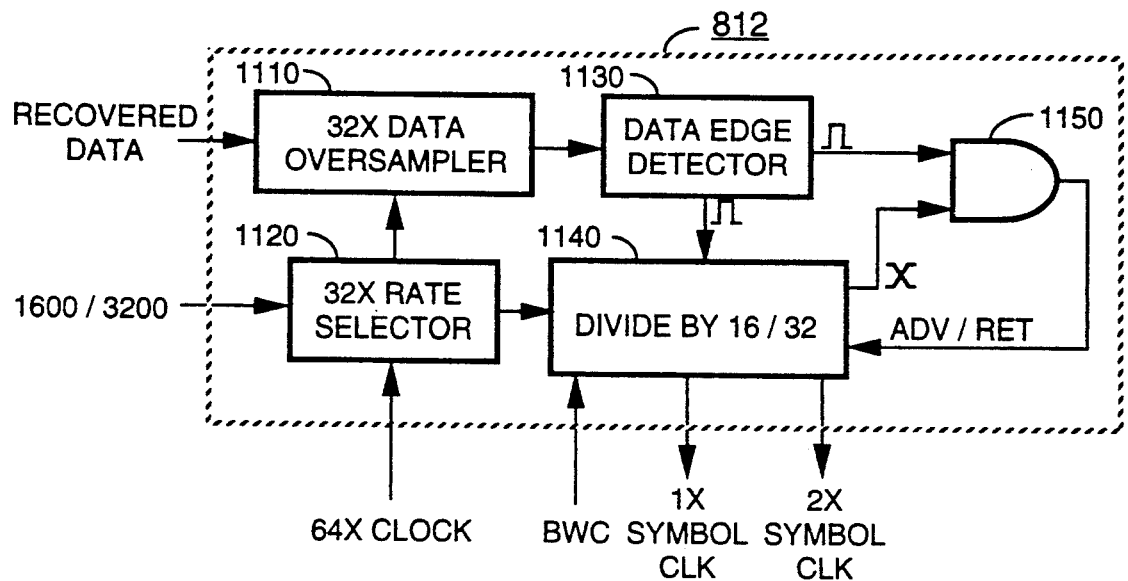
FIG. 11 is an electrical block diagram of a symbol synchronizer utilized in the data communication receiver of FIG. 8.

The operation of the symbol synchronizer 812 is best understood by referring to FIG. 11. The 64X clock at 102.4 KHz which is generated by frequency divider 846, is coupled to an input of a 32X rate selector 1120. The 32X rate selector 1120 is preferably a divider which provides selective division by 1 or 2 to generate a sample clock which is thirty-two times the symbol transmission rate. A control signal (1600/3200) is coupled to a second input of the 32X rate selector 1120, and is used to select the sample clock rate for symbol transmission rates of 1600 and 3200 symbols per second. The selected sample clock is coupled to an input of 32X data oversampler 1110 which samples the recovered data signal (MSB) at thirty-two samples per symbol. The symbol samples are coupled to an input of a data edge detector 1130 which generates an output pulse when a symbol edge is detected. The sample clock is also coupled to an input of a divide-by-16/32 circuit 1140 which is utilized to generate -1X and 2X symbol clocks synchronized to the recovered data signal. The divided-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-16/32 circuit 1140, the output generated by AND gate 1150 causes the count of divide-by-16/32 circuit 1140 to be retarded by one count in response to the pulse which is coupled to the input of divide-by-16/32 circuit 1140 from the data edge detector 1130, thereby enabling the synchronization of the 1X and 2X symbol clocks with the recovered data signal. The symbol clock rates generated are best understood from the table below.

| Input Clock (Relative) | Control Input (SPS) | Rate Selector Divide Ratio | Rate Selector Output | 2X Symbol Clock (BPS) | 1X Symbol Clock (BPS) |
|---|---|---|---|---|---|
| 64X | 1600 | by 2 | 32X | 3200 | 1600 |
| 64X | 3200 | by 1 | 64X | 6400 | 3200 |

As shown in the table above, the 1X and 2X symbol clocks are generated 1600, 3200 and 6400 bits per second and are synchronized with the recovered data signal.

Figure 12:
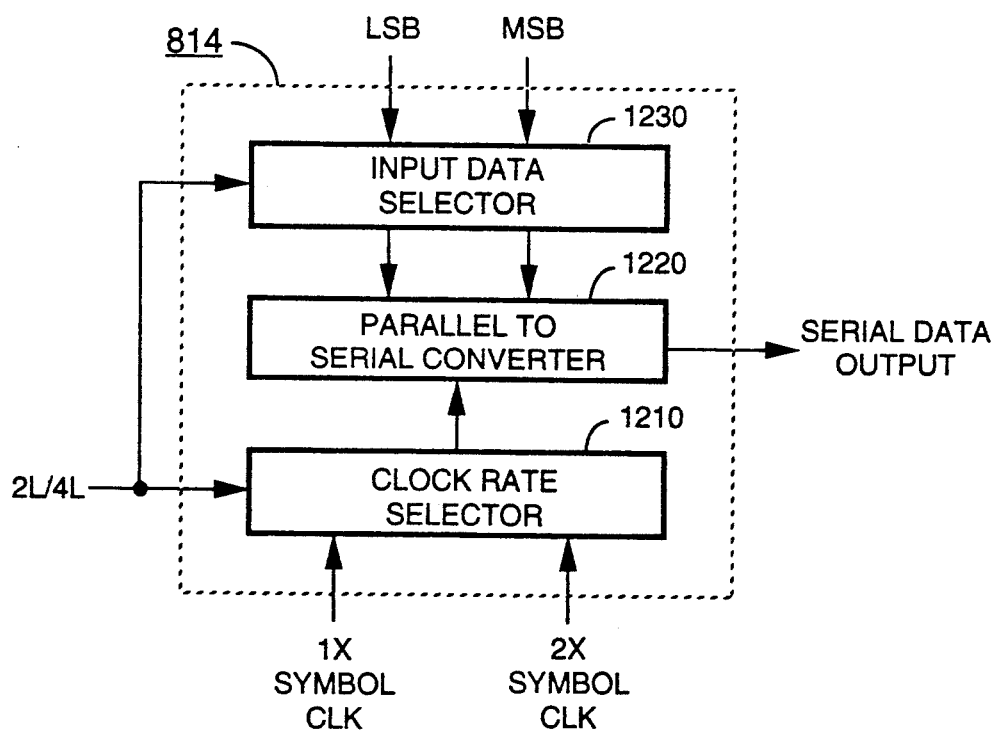
FIG. 12 is an electrical block diagram of a 4-level to binary converter utilized in the data communication receiver of FIG. 8.

The 4-level binary converter 814 is best understood by referring to FIG. 12. The 1X symbol clock is coupled to a first clock input of a clock rate selector 1210. A 2X symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data, or 4-level FSK data. When the 2-level FSK data conversion (2L) is selected, only the MSB output is selected which is coupled to the input of a parallel to serial converter 1220. The 1X clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2X clock input is selected by clock rate selector 1210 which results in a serial two bit binary data stream to be generated at 2X the symbol rate, which is provided at the output of the parallel to serial converter 1220.

Returning to FIG. 8, the serial binary data stream generated by the 4-level to binary converter 814 is coupled to inputs of a synchronization word correlator 818 and a demultiplexer 820. The synchronization word correlator 818 is best understood with reference to FIG. 13. Predetermined "A" word synchronization patterns are recovered by the controller 816 from a code memory (code plug memory) 822 and are coupled to an "A" word correlator 1310. When the synchronization pattern received matches one of the predetermined "A" word synchronization patterns within an acceptable margin of error, an "A" or "A-bar" output is generated and is coupled to the controller 816. The particular "A" or "A-bar" word synchronization pattern correlated provides frame synchronization to the start of the frame ID word, and also defines the data bit rate of the message to follow, as was previously described.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization word, as described above, and which continues to be supplied to enable processing of the remainder of the synchronization code. The controller 816 compares the frame number currently being received with a list of one or more assigned frame numbers normally stored in the code memory 822. The assigned frame numbers may be assigned to the data communication receiver 106 in different ways which will be more fully discussed below.

Should the currently received frame number differ from the assigned list of one or more frame numbers, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 13:
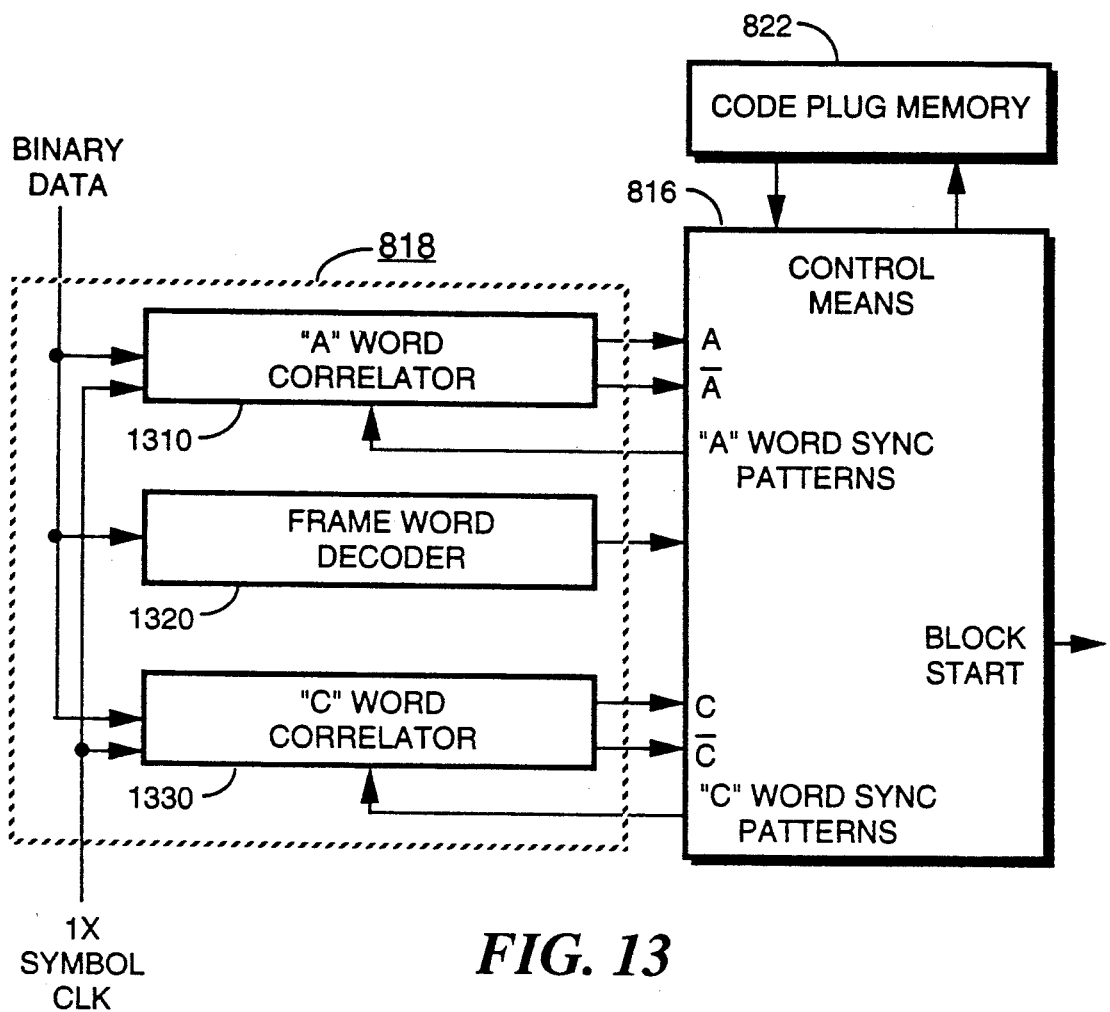
FIG. 13 is an electrical block diagram of a synchronization correlator utilized in the data communication receiver of FIG. 8.

Returning to the operation of the synchronization correlator shown in FIG. 13, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 14:
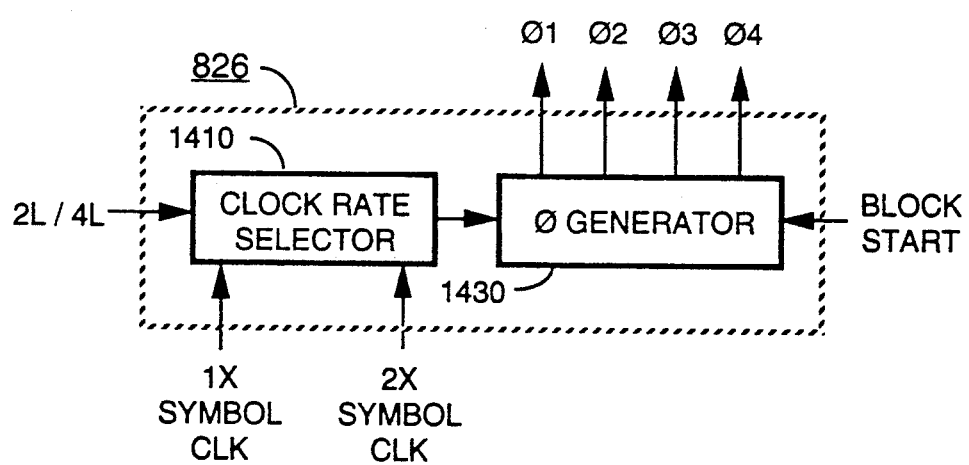
FIG. 14 is an electrical block diagram of a phase timing generator utilized in the data communication receiver of FIG. 8.

Returning to FIG. 8, the start of the actual data portion is established by the controller 816 generating a block start signal (Blk Start) which is coupled to inputs of a word de-interleaver 824 and a data recovery timing circuit (phase timing generator) 826. The data recovery timing circuit 826 is best understood by referring to FIG. 14. A control signal (2L/4L) is coupled to an input of clock rate selector 1410 which selects either 1X or 2X symbol clock inputs. The selected symbol clock is coupled to the input of a phase generator 1430 which is preferably a clocked ring counter which is clocked to generate four phase output signals ($\phi$1–$\phi$4). A block start signal is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 8, the clocked phase signal outputs are coupled to inputs of a phase selector 828. During operation, the controller 816 normally recovers from the code memory 822, the transmission phase number to which the data communication receiver 106 is assigned. Optionally, the data communication receiver 106 can be assigned to a list of one or more phases which the controller 816 then selects in a predetermined order or, alternatively, in a dynamically assigned scheme as will be more fully discussed below.

The selected phase number, e.g., 0, 1, 2, or 3, is transferred to the phase select output ($\phi$ Select) of the controller 816 and is coupled to an input of the phase selector 828. The controller 816 typically has a "default" assigned phase number which is normally configured in the code memory 822. Optionally, the controller 816 can have a phase number assigned in the first message block of a fragmented message indicating a phase to switch to for receiving subsequent message blocks of the transmitted message, as will be more fully discussed below. Hence, the phase number for receiving information over the communication channel can be predetermined at the communication receiver 106 or can be dynamically assigned for receiving fragmented messages over multiple phases in the communication protocol.

A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of address correlator 830. The controller 816 recovers the address patterns assigned to the data communication receiver 106, and couples the patterns to a second input of the address correlator. When any of the de-interleaved address code words matches any of the address patterns assigned to the data communication receiver 106 within an acceptable margin of error, the message information associated with the address is then decoded by the data decoder 832 and stored in a message memory 850 in a manner well known to one of ordinary skill in the art. Hence, the data communication receiver, e.g., the selective call receiver 106, can selectively receive the message information.

Following the storage of the message information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838, such as buttons, switches, or keys on a keyboard, in a manner well known in the art.

Following the detection of an address associated with the data communication receiver 106, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory 850, and provides the message information to a display driver 840 for presentation on a display 842, such as an LCD display. Optionally, the data communication receiver 106 can share a data interface (not shown), such as a serial or parallel computer interface, with a computing device, such as a personal computer, and can couple at least the message information to the computing device. The message information then can be utilized in functions of the computing device, as may be desired by a user of the computing device.

Figure 15:
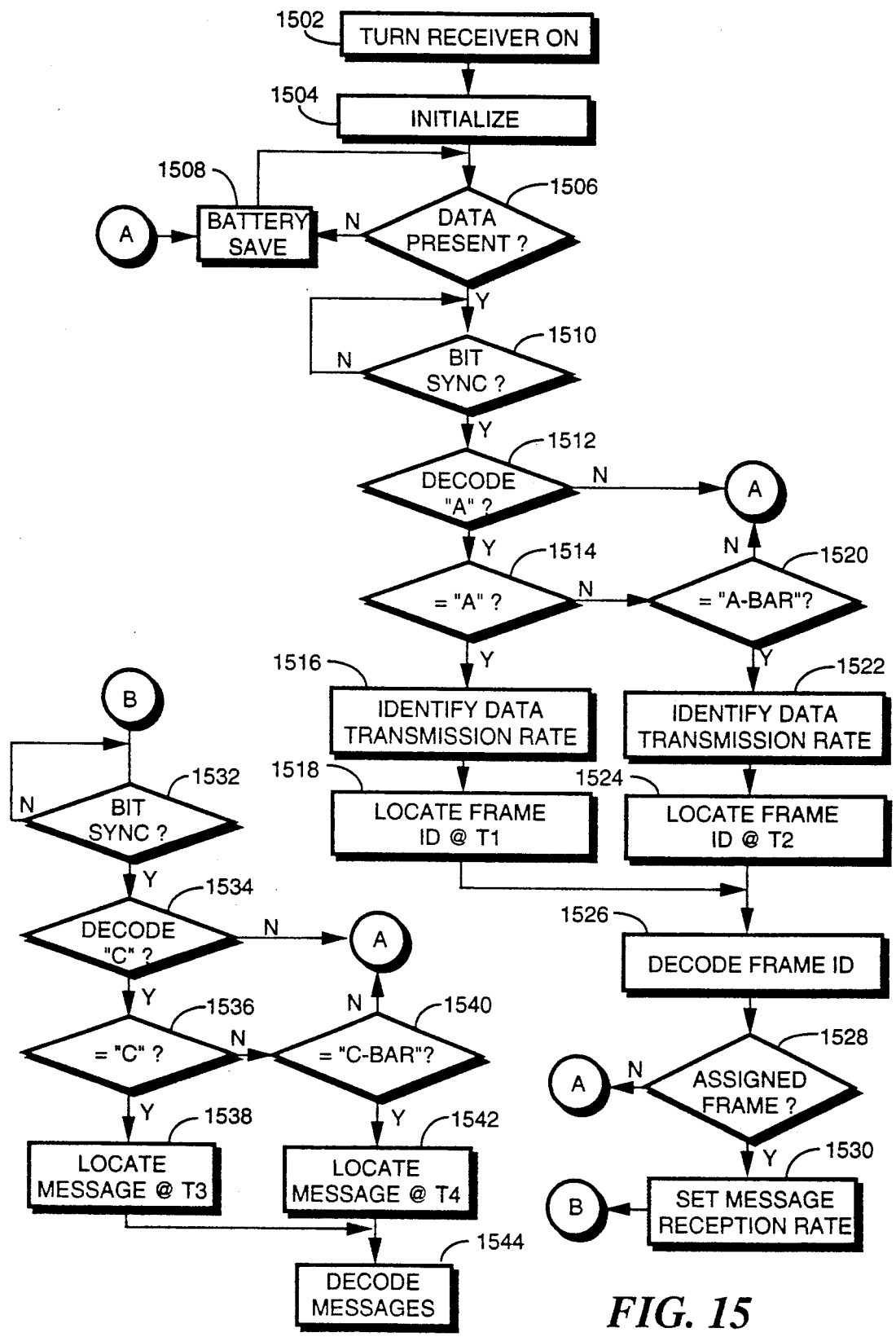
FIG. 15 is a flow chart illustrating the synchronization correlation sequence in accordance with the preferred embodiment of the present invention.

FIG. 15 is a flow chart describing the operation of the data communication receiver 106 in accordance with the preferred embodiment of the present invention. At step 1502, when the data communication receiver is turned on, the controller operation is initialized, at step 1504. Power is periodically applied to the receiver portion to enable receiving information present on the assigned RF (radio frequency) channel. When data is not detected on the channel in a predetermined time period, battery saver operation is resumed, at step 1508.

When data is detected on the channel, at step 1506, the synchronization word correlator begins searching for bit synchronization at step 1510. When bit synchronization is obtained, at step 1510, the "A" word correlation begins at step 1512. When the non-complemented "A" word is detected, at step 1514, the message transmission rate is identified as described above, at step 1516, and because frame synchronization is obtained, the time (T1) to the start of the frame identification code word is identified, at step 1518.

When the non-complemented "A" word is not detected, at step 1514, indicating the non-complemented "A" word may have been corrupted by a burst error during transmission, a determination is made whether the complemented "A bar" is detected, at step 1520. When the "A bar" word is not detected at step 1512, indicating that the "A-bar" word may also have been corrupted by a burst error during transmission, battery saver operation is again resumed, at step 1508.

When the "A-bar" word is detected, at step 1520, the message transmission rate is identified as described above, at step 1522, and because frame synchronization is obtained, the time (T2) to the start of the frame identification code word is identified, at step 1524. At the appropriate time, decoding of the frame identification word occurs, at step 1526. When the frame ID detected is not one assigned to the data communication receiver, at step 1528, battery saving is resumed, at step 1508, and remains so until the next assigned frame is to be received. When the decoded frame ID corresponds to an assigned frame ID, at step 1528, the message reception rate is set, at step 1530. An attempt to bit synchronize at the message transmission rate is next made at step 1532. When bit synchronization is obtained, at step 1532, the "C" word correlation begins at step 1534. When the non-complemented "C" word is detected, at step 1536, frame synchronization is obtained, and the time (T3) to the start of the message information is identified, at step 1538.

When the non-complemented "C" word is not detected, at step 1536, indicating the non-complemented "C" word may have been corrupted by a burst error during transmission, a determination is made whether the complement "C bar" is detected, at step 1540. When the "C bar" word is not detected at step 1540, indicating that the "C-bar" word may also have been corrupted by a burst error during transmission, battery saver operation is again resumed, at step 1508. When the "C-bar" word is detected, at step 1540, frame synchronization is obtained, and the time (T4) to the start of the message information is identified, at step 1542. At the appropriate time, message decoding can begin at step 1544.

In summary, by providing multiple synchronization code words which are spaced in time, the reliability of synchronizing with synchronization information which is subject to burst error corruption is greatly enhanced. The use of a predetermined synchronization code word as the first synchronization code word, and a second predetermined synchronization code word which is the complement of the first predetermined synchronization code word, allows accurate frame synchronization on either the first or the second predetermined synchronization code word. By encoding the synchronization code words, additional information, such as the transmission data rate can be provided, thereby enabling the transmission of message information at several data bit rates. By using a second coded synchronization word pair, "fine" frame synchronization at the actual message transmission rate can be achieved, and again due to spacing in time of the synchronization code words, the reliability of synchronizing at a different data bit rate with synchronization information which is subject to burst error corruption is greatly enhanced, thereby improving the reliability of the data communication receiver to receive and present messages to the receiver user.

FIG. 16 is a timing diagram illustrating the organization of the transmission frame utilized in accordance with the preferred embodiment of the present invention. As previously described for FIG. 4 and shown again in FIG. 16, the transmission frame comprises a synchronization code word 1600 followed by eleven data blocks labeled Block 0 to Block 10. Address, control and message code words are distributed within the eleven data blocks in a predetermined order. The first code word, located in Block 0, is always a block information code word 1602 and includes such information as the beginning locations of an address field 1604 and a vector field 1606, leaving eighty-seven code words available in the frame for the transmission of address, vector and data code words.

By knowing the beginning location of the address field 1604 and the vector field 1606, the controller 816 is able to calculate how many address code words must be decoded per frame in order to determine when a message is present within the frame. Consequently, the address field 1604 includes one or more address code words corresponding to messages located within a data field 1608. Address code words specifying, for example, numeric and alphanumeric messages have associated message information located within the data field 1608. Tone only messages can communicate all necessary information in the address code word, or optionally with a control code word in the vector field 1606, and consequently would not have associated message information located within the data field 1608.

For those address code words 1605 which do have corresponding messages 1610, the vector field 1606 includes control words 1607, or vectors, which include information to identify the starting location 1612 of messages 1610 located within the data field 1608. Specifically, the vector code word 1607 identifies the location of the first data code word 1612 and also the number of data code words in the data portion 1610 of the message for the current frame. Further, there is a one to one correspondence between the relative location of the address code words 1605 located within the address field 1604 and the relative location of the associated vectors (vector code words) 1607 located within the vector field 1606. In this way, the relative location of an address code word 1605 in the address field 1604 points to the location of an associated vector 1607 in the vector field 1606 which includes information that then points via 1609 to the starting location 1612 of a message 1610 in the data field 1608 of the current frame. This indirect pointing scheme provides significant flexibility in arranging the message information within transmission frames for the communication system 100 because the message information, including the relative starting position of the message information in a transmission frame, can be dynamically allocated to one or more transmission frames as the frames are being processed for transmission. Hence, the paging terminal 102 can organize the message information into the transmission frames as the paging requests are being processed with significant flexibility in selecting the relative position of the message information within the transmission frames.

Referring to FIG. 17, a timing diagram illustrates the composition of the first data code word 1612 in the data portion of a message in accordance with the preferred embodiment of the present invention. As can be seen, the data code word 1612 is a 32 bit word. Further, it is preferably organized as a 32, 21 BCH code word. From the least significant bit (LSB) to the most significant bit (MSB), the data code word 1612 includes a 21 bit data field 1710, a 10 bit parity word 1720, and a parity bit 1730. In this signaling protocol, the 10 bit parity word 1720 is selected such that every data code word 1612 differs by at least 5 bits from every other data code word 1612 in the protocol. The parity bit 1730 can be defined as an even or an odd parity bit for the entire address code word 1612. For example, if the lower 31 bits of a data code word 1612 include an even number of ones then the parity bit 1730 may be set to zero. Further, for an odd number of ones in the lower 31 bits of a data code word 1612, the parity bit 1730 may be set to 1. Hence, the parity bit 1730 provides a relatively quick way to detect 1 bit of error in a received data code word 1612.

The 21 bit data field 1710 of the first data code word 1612 in the data portion 1610 of a message is preferably formatted to define certain flags and fields as discussed below. A continue flag 1702, such as bit 11 of the 21 bit data field 1710, indicates when fragments of the current message being transmitted are to be expected in following frames. For example, if the continue flag 1702 is set to one, then this indicates to the communication receiver 106 that one or more fragments of the current message being transmitted can be expected in the following frames. Additionally, a packet number 1704 is included in the 21 bit data field 1710 of the first data code word 1612 of the data portion 1610 of the message being transmitted in the current frame. The message packet number 1704 identifies the current data portion of the message in the current frame as one of a sequence of data packets. For example, the message packet number 1704 can increment by one in successive message packets. In this way, the communication receiver 106 can keep track of the message packets and store them in the message memory 850 in the correct sequence. A special signature field 1706 is also included in the 21 bit data field 1710 of the first data code word 1612 of the data portion of the message being transmitted in the current frame. The signature field 1706 uniquely identifies the sequence of successive message packets such that the communication receiver 106 can keep track of the current message sequence being received and decoded. That is, while a fragmented message is being received, i.e., in successive message packets, the communication receiver 106 can receive other messages and distinguish them apart by their unique signature field 1706.

Additionally, a phase assignment field 1708 is included for identifying the phase, e.g., phase one, two, three, or four, on which any subsequent message fragments will be transmitted to the communication receiver 106. For example, a first message fragment can indicate by the phase assignment field 1708 that subsequent message fragments will be transmitted on (and can be received from) phase three. Consequently, the communication receiver 106 can subsequently switch phase to receive message fragments from phase three. Also, a frame assignment field 1709 in combination with the phase assignment field 1708 can instruct the communication receiver 106 to monitor one or more frames in the assigned phase for receiving the remaining fragmented message, as will be more fully discussed below.

Other information, such as in the frame assignment field 1709, can indicate to the communication receiver 106 in which frame (or sequence of frames) to monitor for receiving subsequent message fragments. For example, the frame assignment field 1709 can indicate that the communication receiver 106 can search every third frame for possibly receiving a subsequent message fragment. The pattern of frames to search indicated by the frame assignment field 1709 can be determined dynamically by the terminal 102 while preparing the message for transmission to the communication receiver 106. Alternatively, the pattern can be predetermined by system configuration, or even selected by a system operator to respond to varying system requirements and communication traffic patterns. Similarly, the phase assignment field 1708 can be predetermined or dynamically set by the terminal 102 (or the system operator) to handle varying system requirements and communication traffic activity. It can be appreciated by one of ordinary skill in the art that the size of each of the aforementioned data fields can vary to accommodate different system configurations and parameters within the scope of the present invention. The preferred mode of implementing the fragmented message protocol will be more fully discussed below.

As discussed above, a portion 1610 of the data of a message can be transmitted as a message packet. Subsequent message packets can be transmitted in the same frame or in subsequent frames of the transmission protocol, or even in subsequent frames of an alternative phase (in a multi-phase communication protocol) as will be further discussed below. The continue flag 1702 can remain set to one, for example, while there are more message packets to be received by the communication receiver 106. The final message packet is then indicated when the continue flag 1702 is set to zero. Moreover, each message packet in the sequence is identified by a message packet number 1704, which preferably increments in a circular fashion to indicate the sequential relationship between the message packets being received from frame to frame. For example, FIG. 18 is a timing diagram illustrating one such sequence of packet numbers for a transmitted message. The first message packet in the sequence may be flagged with the message packet number field 1704 being set to "11" 1802, and with the continue flag 1702 being set to 1. While there are more message packets to be received by the communication receiver 106, the continue flag 1702 will continue to be set to 1 in the first data code word 1612 of each of the subsequent message packets 1610. Further, the message packet number field 1704 can increment using modulo three arithmetic 1804 for each subsequent message packet. That is, the message packet number field 1704 for the second, third and fourth successive message packets will have the values "00", "01", "10" 1804, with the message packet numbering sequence repeating itself in subsequent message packets. The "11" state of the message packet number field 1704 is skipped in this numbering sequence to avoid confusion with an initial packet of a non-continued message. Of course, the final message packet is indicated by the continue flag 1702 being set to zero. Additionally, the signature field 1706 identifies all the sequential message packets as being part of one message. Hence, multiple fragmented messages can be contemporaneously received by the communication receiver 106 with the signature field 1706 of each message packet identifying the message that the particular message packet belongs to. Therefore, the combination of the continue flag 1702, the message packet number 1704, and the signature field 1706 allows the communication receiver 106 to receive and decode message fragments constituting two or more different messages being received over the same time interval. The communication receiver 106 can then join the message packets corresponding to each of the two or more messages to reconstruct each of the received and decoded messages to their original data content.

Figure 19:
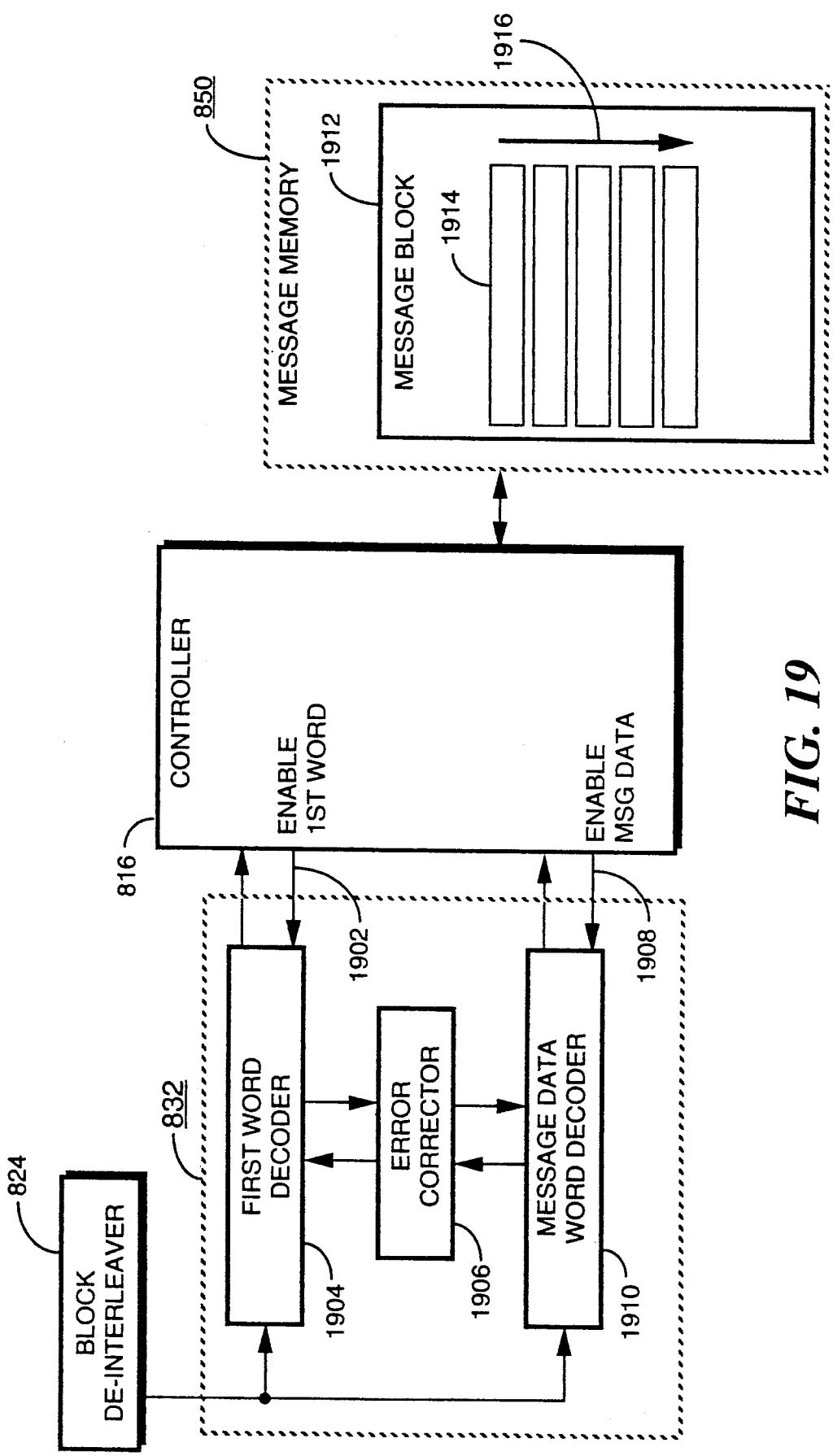
FIG. 19 is a more detailed block diagram of the data decoder of FIG. 8, according to the preferred embodiment of the present invention.

FIG. 19 is a more detailed block diagram of the data decoder 832, the controller 816, and the message memory 850 of the communication receiver 106, according to the preferred embodiment of the present invention. As discussed earlier for FIG. 16, the communication receiver 106 can correlate an address 1605 in the address field 1604 of a frame in an assigned phase. Specifically, the address correlator 830 (FIG. 8) signals the controller 816 that there is a match between the received address 1605 and a predetermined address pattern from the code memory 822. Subsequently, the communication receiver 106 decodes the vector code word 1607 in the vector field 1606 that corresponds in position to the address code word 1605, and therefrom the controller 816 can determine when the first data code word 1612 of the data portion 1610 of the message occurs in the data field 1608. An output of the block deinterleaver 824 couples a stream of bits to an input of the data decoder 832. This stream of bits includes at the appropriate point of the data field 1608 of the frame the first data code word 1612 of the data portion 1610 of the message.

The controller 816 couples an enable first word output signal 1902 to an input of the data decoder 832 to indicate to a first word decoder 1904 that the data code word 1612 is present in the incoming data stream. The first word decoder 1904 captures the 32 bit data code word 1612 and couples it to an error corrector 1906. The error corrector 1906 can correct up to a predetermined number of error bits, such as two error bits, in a data code word 1612. As mentioned earlier, the data code word 1612 is organized with the parity word 1720 (FIG. 17) to allow the error corrector 1906 to correct up to the two error bits included in a received data code word in a manner well known to those skilled in the art. As a result of the error correction, the error corrector 1906 returns back to the first word decoder 1904 a corrected 32 bit data code word 1612 and an indication that the correction was successful. If the error correction was not successful, then the error corrector would return an indication thereof and the first word decoder 1904 could not reliably utilize the first data code word 1612. In such a case, the data portion 1610 of the message can still be decoded and stored in message memory 850. However, the lost information in the first data code word 1612 of the particular portion 1610 of the message may leave an orphan message packet, i.e., not being associated with any of the other message packets of a message.

After the first word decoder 1904 receives the corrected data code word 1612 from the error corrector 1906 it checks the continue flag 1702 and the message packet number field 1704 to determine if this is a message packet of a fragmented message or if it is the one and only message packet of a complete message. If the continue flag 1702 is set to one it indicates that this message packet is part of a fragmented message. Further, if the message packet number 1704 is set to "11" then this is the first message packet in a sequence of message packets constituting a fragmented message. The message is uniquely identified by the signature field 1706. Additionally, the phase assignment field 1708 can include information to identify a subsequent phase for receiving one or more subsequent transmitted message fragments. Also, the frame assignment field 1709 can identify one or more alternative frames for receiving any subsequent transmitted message fragments. Note however that if this message packet is the one and only message packet in a message, then the continue flag 1702 will be set to zero and the message packet number 1704 will be set to "11", and the communication receiver 106 can ignore the information in the phase assignment field 1708 and frame assignment field 1709.

The first word decoder 1904 indicates to the controller 816 that this is the start of a new message, and whether the message is completely found in the data portion 1610 of the message in the current frame or alternatively it is a fragmented message found over successive message packets. The first word decoder 1904 also couples the 21 bit data field 1710 of the data code word 1612 to the controller 816, which then couples the 21 bits of information to a message block 1912 in the message memory 850. The 21 bits of information are preferably stored at a starting location 1914 in the message block 1912 in the message memory 850. The controller 816 then couples an enable signal 1908 to the message data word decoder 1910 to decode all subsequent data code words in the data portion 1610 of the message in the current frame. The message data word decoder 1910 captures the 32 bit data code words out of the stream of data from the block deinterleaver 824 and couples each of the data code words to the error corrector 1906 to correct up to two error bits in a received data code word.

The error corrector 1906 couples a corrected data code word back to the message data word decoder 1910 and further indicates the successful correction. If the error correction fails on a particular data code word then the message data word decoder 1910 preferably replaces the 21 bit data field from the failed data code word with a predetermined bit pattern and couples the 21 bits of information to the controller 816. The predetermined bit pattern may help indicate to a user of the communication receiver 106, such as when the message is displayed on the display 842 (FIG. 8) that the particular portion of the message in the failed data code word was corrupted during transmission.

Alternatively, after a successful error correction the message data word decoder 1910 strips the 21 least significant bits (LSB) of the corrected data code word 1612 and couples these bits of information to the controller 816. The controller 816 then couples the information bits to the message block 1912 in the message memory 850 to append the 21 bits of information to the information already present in the first location 1914 in the message block 1912. The message data word decoder 1910 continues to decode the subsequent data code words of the data portion 1610 of the message in the current frame while enabled 1908 by the controller 816. Consequently, the 21 bits data field 1710 of each of the data code words in the data portion 1610 of the message in the current frame are coupled to the message memory 850 and appended to the information bits in the first location 1914 of the message block 1912.

After all the data code words are decoded for the data portion 1610 of the message in the current frame, the first location 1914 in the message block 1912 contains the respective message data. This message data stored in the message block 1912 can be organized to allow the controller 816 to subsequently couple the information to the display driver 840 for displaying on the display 842 in a manner well known to those skilled in the art. If the data portion 1610 of the message in the current frame constitutes the entire message then the information in the location 1914 in the message block 1912 can be retrieved by the controller 816 for presentation to a user, such as via the display 842. However, if the information in the location 1914 constitutes only a message packet of a fragmented message, as indicated by the continue flag 1702 and the message packet number 1704 in the first 21 bits of information in the location 1914, then the controller 816 will continue searching for message packets of the fragmented message until all the subsequent message packets can be received and decoded and stored in subsequent locations 1916 in the message block 1912. FIG. 19 shows for example a message block 1912 comprising the message information from five packets of a fragmented message.

As the first data code word 1612 of each successively received message packet 1910 is decoded by the first word decoder 1904, the respective continue flag 1702, the message packet number 1704, the signature 1706, the phase assignment 1708, and the frame assignment 1709, and other included information as necessary, are coupled to the controller 816. The controller 816 then compares the signature 1706 to the stored signature in the first location 1914 of each message block 1912 in the message memory 850. A matching signature 1706 indicates that the current message packet corresponds to the fragmented message being stored in sequential packets in the message block 1912. The controller 816 then determines whether the current message packet being decoded is in the proper sequence to the already stored message packets in the message block 1912. As discussed earlier, the sequence is indicated by the message packet number 1704. If the message packet is out of sequence, this may indicate that a previous message packet was lost during transmission. The controller 816 can continue to store the successive message packets in the message block 1912 until the final message packet is decoded and stored in the message block 1912. The final message packet is indicated by the continue flag 1702 being set to zero in the first data code word 1612 of the particular message packet 1610. In this way, the communication receiver 106 can receive and decode one or more fragmented messages.

Once the communication receiver 106 detects the first message packet of a fragmented message, as indicated by the continue flag 1702 being set to 1 and the message packet number 1704 being set to "11", the communication receiver 106 will continue searching through the current frame and into subsequent frames for successive message packets corresponding to the fragmented message being received. Specifically, the communication receiver 106 searches the address field 1604 of each successive frame, or each assigned frame, for the particular address code word 1605, and then utilizes the vector code word 1607 corresponding to the address code word 1605 to point via 1609 to the next message packet 1610. The message packet is indicated by the information bits in the 21 bit data field 1710 of the first data code word 1612 of the data portion 1610 of the message in the current frame.

This message packet decoding protocol allows the terminal 102 in the communication system to redistribute traffic of long messages over a combination of multiple frames, or multiple phases, or multiple communication channels, as will be more fully discussed below. By creating smaller packets 1610 of message information and distributing these over one or more frames as needed, the terminal 102 can better manage the message traffic to the communication receivers 106. For example, if an emergency message needs to be transmitted over a communication channel the terminal 102 can packetize a long message into smaller message packets and fit the emergency message into the current frame along with one or more of the smaller packets of the fragmented message. Hence, long messages can be reduced to a number of short message packets and transmitted over one or more frames to distribute the traffic over the communication channel. In this way, other messages can also at least partially be transmitted during the current frame as necessary. Additionally, by sending shorter message packets the probability of fading errors corrupting a portion of the message can be reduced.

Figure 20:
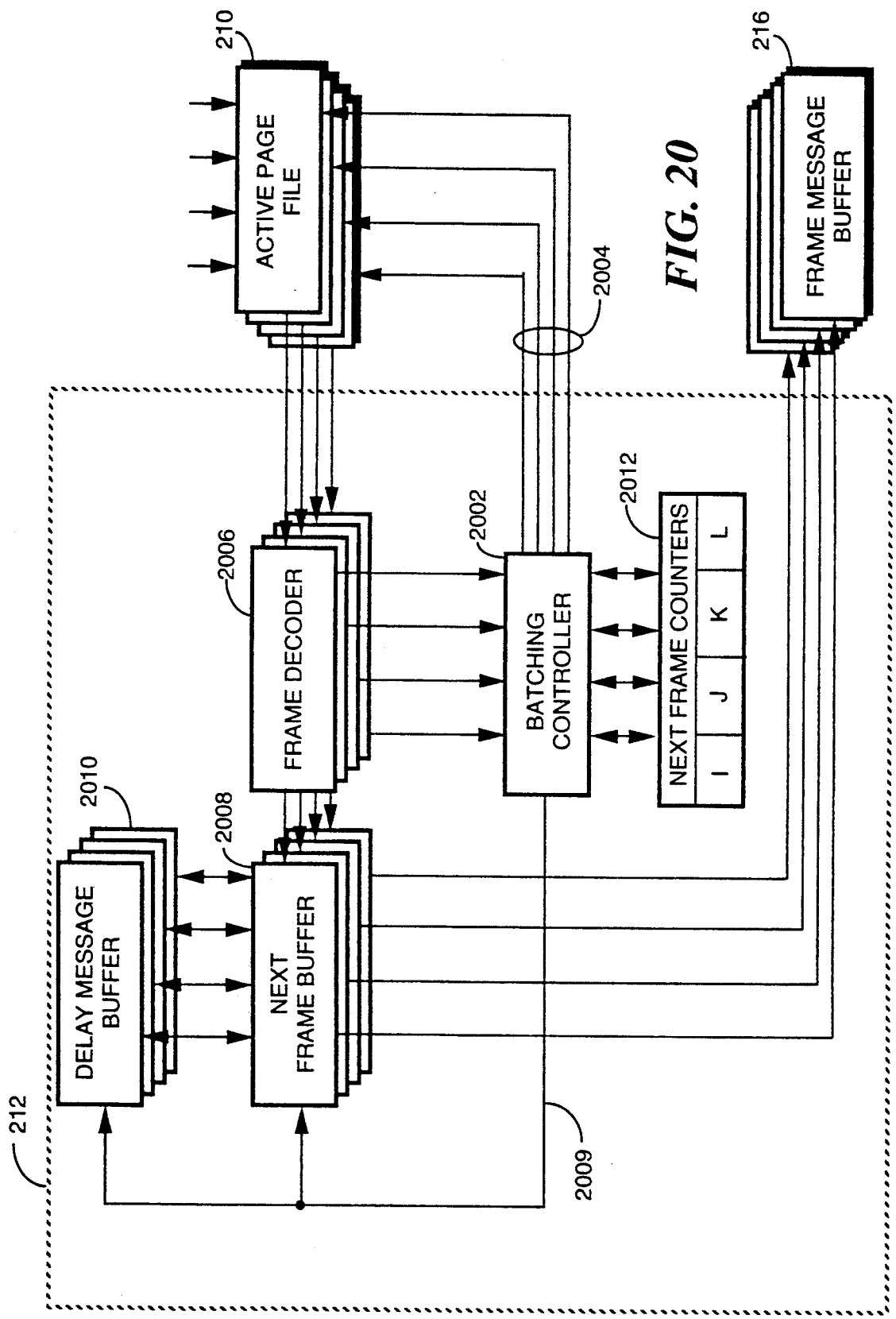
FIG. 20 is a more detailed block diagram of the frame batcher of FIG. 2, in accordance with the preferred embodiment of the present invention.

FIG. 20 is a more detailed block diagram of the frame batcher 212 (FIG. 2), according to the preferred embodiment of the present invention. As described above, messages which are received are stored in the active page file 210. The active page file 210 is preferably a dual-port, first-in-first-out random access memory which is further delineated by message transmission phase, and which stores the messages in the order in which the messages were received according to the message transmission phase assigned to the data communication receiver. It will be appreciated that other memory types, such as hard disk drives can be utilized as well for implementing the active page file 210.

Periodically, such as once each transmission frame interval or cycle, a batching controller 2002 having outputs 2004 sequentially accesses the messages stored in the message storage areas representing the message transmission phases of the active page file 210. The recovered messages are coupled to inputs of a frame decoder 2006 which identifies those messages which are to be transmitted during the current transmission frame. When a message is detected within any of the message transmission phases and which is to be transmitted during the current transmission frame, the frame decoder 2006 generates a message detection signal which is coupled to the controller 2002. The controller 2002 then analyzes the corresponding message to determine the number of code words which will be required for message transmission. Because every frame is of a predetermined length, sometimes not all message information from the active page file 210 can be transmitted in the next frame. For example, if one or more messages are longer than can fit in the next frame, then the frame batcher 212 may fragment the long messages into one or more message packets for transmission over one or more frames. Depending on the transmission phase assigned to the recovered messages, the controller 2002 couples calculated message code word counts to a group of next frame counters 2012 which maintain a total count of the message code word requirements for the next frame for each of the four phases. The message for the next transmission frame is also stored in a next transmission frame buffer 2008 under control 2009 of the batching controller 2002, such as via a bus 2009, the message being stored according to its assigned phase. When the code word count maintained by the frame counter 2012 for the next frame exceeds a predetermined transmission frame queue capacity, such as eighty-seven code words, the excess messages and message fragments of fragmented messages can be stored in a carry-on buffer (hereinafter called a delay message buffer) 2010. The excess messages or message fragments stored in the delay message buffer 2010 will be transmitted in one or more subsequent transmission frames, as will be discussed below.

To indicate the amount of delay time each message or message fragment has experienced while being delayed in the delay message buffer 2010, each message or message fragment is associated with a message carry-on value stored in the delay message buffer 2010. This carry-on value can be set to a predetermined number of frame transmission cycles, e.g., thirty one cycles, which the message can be delayed with no consequence in the communication protocol. As each opportunity to transmit the message or message fragment arrives and possibly passes without transmitting at least a fragment of the message the carry-on value is decremented for the particular message to keep track of the delay time. When the carry-on value reaches zero, such as may be possible during a very busy time interval for a communication system 100, the priority of the message is elevated requiring at least a minimal message fragment to be transmitted during the next transmission frame. This minimal message fragment comprises an address code word, a vector code word, a first data code word which includes control information such as the continue flag 1702, the message packet number 1704, the signature 1706, the phase assignment 1708, and the frame assignment 1709. This minimal message fragment also comprises a message information data code word which provides one data code word of message information to the communication receiver 106. Hence, the minimal message fragment in this example comprises four code words.

This protocol keeps the terminal 102 and the communication receiver 106 synchronized while delivering all message packets in a fragmented message to the communication receiver 106. The communication receiver 106 after monitoring for subsequent message fragments for a predetermined time interval (predetermined number of assigned frames) without receiving any message fragment for the message can determine that there was error in the communication of the fragmented message. Therefore, the communication protocol provides a predetermined time interval for delivering another message fragment within the varying message traffic load in the communication channel.

After all messages for the next transmission frame have been determined by the batching controller 2006 and are stored in the next frame buffer 2008, the messages or message fragments stored in the next frame buffer 2008 are then coupled to the frame message buffer 216. Subsequently, the terminal can process the messages and then the paging system can transmit the messages in a manner as described for FIG. 2.

Figure 21:
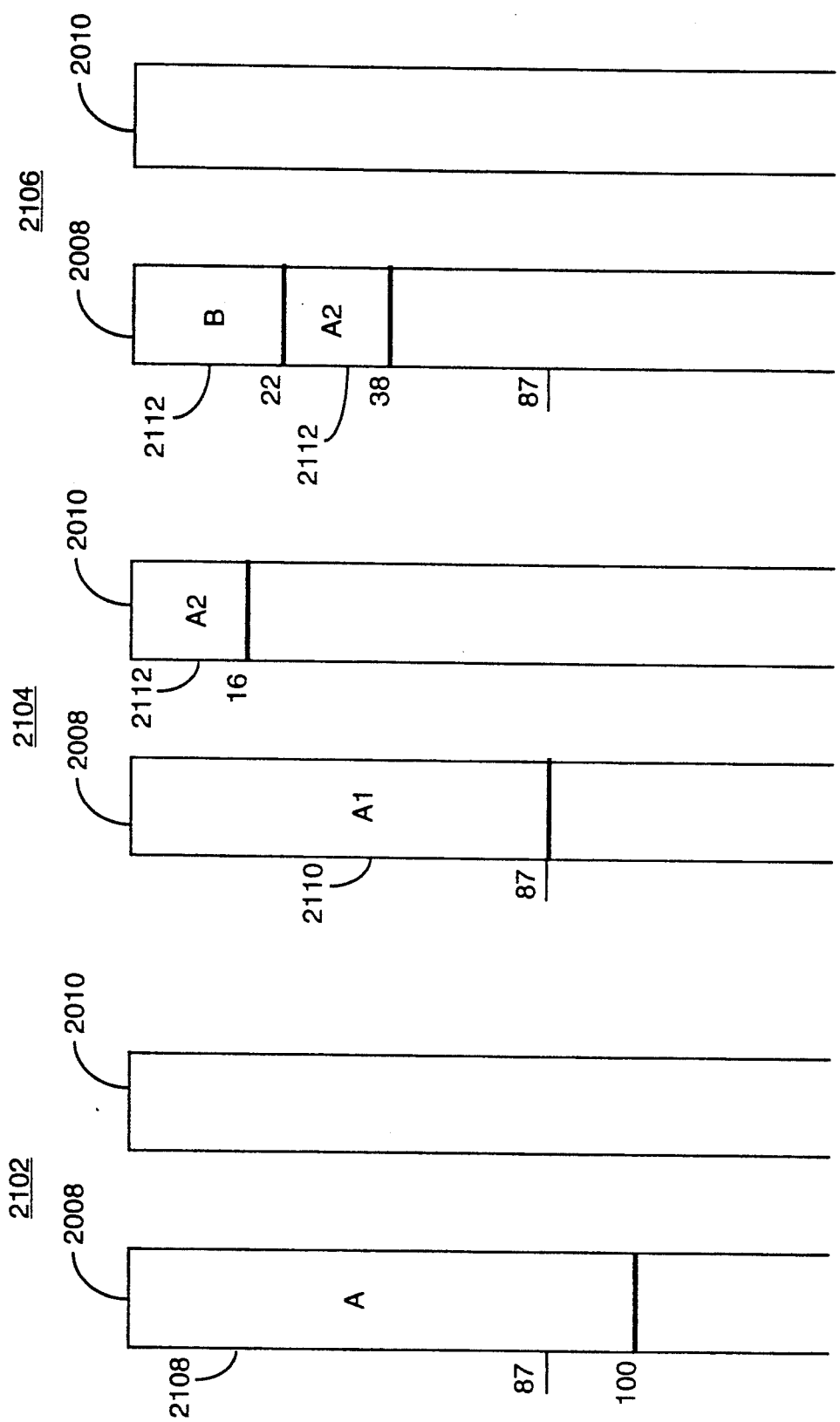
FIG. 21 is a first symbolic representation of messages being processed by the frame batcher of FIG. 20, in accordance with the preferred embodiment of the present invention.

FIG. 21 is a symbolic representation of messages being processed between the next frame buffer 2008 and the delay message buffer 2010 by the frame batcher 212, in accordance with the preferred embodiment of the present invention. Initially, the frame batcher 212 recovers from the active page file 210 the message information that has a frame number assignment equal to the number of the next frame scheduled to be transmitted. This message information is temporarily stored in the next frame buffer 2008 as illustrated in step 2102. For illustration purposes, each frame has a predetermined length equivalent to 87 codewords as shown. Further, a single long message "A" 2108 is temporarily stored in the next frame buffer 2008. Message "A" 2108 comprises one hundred codewords as shown. Therefore, the message 2108 is longer than the 87 codeword capacity of the next frame. In this step the delay message buffer 2010 is shown empty. The frame batcher 212 determines to transmit only a portion of message "A" 2108 equivalent to one full frame, or 87 codewords. The remaining message will be stored in a delay message buffer 2010. This is illustrated in the next step 2104, where the frame batcher 212 has divided the message 2108 into two smaller message packets, e.g., "A1" 2110 and "A2" 2112, as shown.

The first message packet "A1" 2110 comprises 87 codewords to fill the entire next frame. This includes three additional codewords as overhead for the address codeword, the vector codeword, and the first data codeword which provides additional control information to the communication receiver 106. As discussed earlier for FIG. 17, the first data codeword of the message packet "A1" 2110 is configured by the frame batcher 212 to include, for example, the continue flag 1702 set to one, the message packet number 1704 set to "11", and to a unique signature in the signature field 1706. Optionally, the signature 1706 can be set to a number such as the number of messages transmitted to the communication receiver 106 during the current billing cycle, which is available from the subscriber database 208 and may be included with the message in the active page file 210.

The second portion of the message "A2" 2112 is stored in the delay message buffer 2010. This message packet 2112 also includes the address codeword, the vector codeword and the first data codeword. At this point, the frame batcher 212 can take the message packet "A1" 2110 from the next frame buffer 2008 and couple it to the appropriate frame message buffer 216 to be transmitted in the next frame. When the next frame is scheduled for transmission, the frame batcher 212 recovers message information having the frame number that matches the number of the next frame for transmission and stores it in the next frame buffer 2008. This is illustrated in the next step 2106, with the new message "B" 2112.

Additionally, the frame batcher 212 appends the second message packet "A2" 2112 to the next frame buffer 2008 for transmission in the next frame. The frame batcher 212 organizes the first data codeword of the second message packet "A2" 2112 to include the continue flag 1702 set to zero, the packet number set to "00" and the signature 1706 set to the same value as was included with the first message packet "A1" 2110. The frame batcher 212 then couples the message information in the next frame buffer 2008 to the next frame message buffer 2016 for subsequent processing and transmission. In this way, the terminal 102 has transmitted the original long message "A" 2108 by transmitting two smaller message packets 2110, 2112, to fill each transmitted frame as much as possible with message information, while allowing other message communication such as the new message "B" 2112 to be transmitted in its designated frame number. That is, the longer message 2108 may be slightly delayed for a full message transmission, while allowing the smaller ongoing messages 2112 to be transmitted in their designated frames.

Notice that in this example the communication receiver 106 will receive in its designated frame the first message packet "A1" 2110 which in the first data codeword identifies itself as a first message packet to the communication receiver 106. The communication receiver 106 then sequentially searches the address field of subsequent frames until it detects the second message packet "A2" 2112 whose first data codeword identifies to the communication receiver 106 that this is the final message packet. That is, the message has been completely received. If there were more message packets to be received, then the continue flag 1702 would remain set to one which would indicate to the communication receiver 106 to continue searching subsequent frames for the successive message packets.

Figure 22:
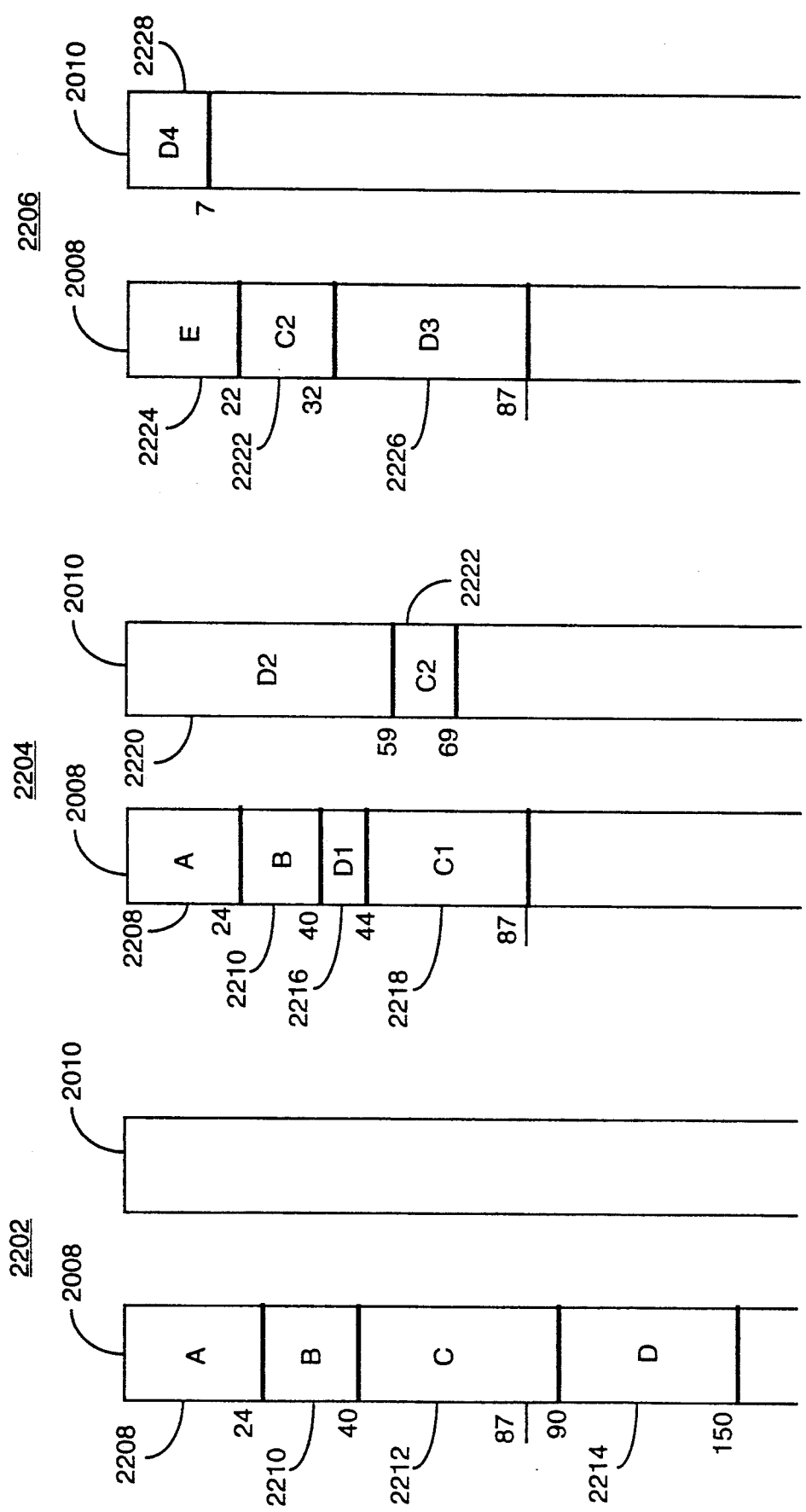
FIG. 22 is a second symbolic representation of messages being processed by the frame batcher of FIG. 20, in accordance with the preferred embodiment of the present invention.

FIG. 22 is a second example illustrating symbolic representation of messages being processed by the frame batcher 212, in accordance with the preferred embodiment of the present invention. Initially, the frame batcher 212 recovers the message information having the frame number assignment for the frame number of the next frame to be transmitted. The frame batcher 212 then couples the message information to the next frame buffer 2008 as shown in the first step 2202.

Here, there are four messages stored in the next frame buffer 2008. The first message "A" 2208 is 24 codewords long. The second message "B" 2210 is an additional 16 codewords long bringing the total so far to 40 codewords in the next frame buffer 2008. The third codeword "C" 2212 is 50 codewords long and the fourth message "D" 2214 is an additional 60 codewords long. This brings the total message information requesting to be transmitted in the next frame to 150 codewords long. However, the next frame can only handle 87 codewords as shown. Therefore, the frame batcher 212 has to determine what messages will be fragmented into smaller message packets.

At this point the delay message buffer 2010 is empty. The frame batcher 212 searches the next frame buffer 2008 for the longest message. The longest message is the fourth message "D" 2214, which is 60 codewords long. The frame batcher 212 then moves this message to the delay message buffer 2010. However, the total number of remaining codewords in the next frame buffer 2008 is 90, which is greater than the 87 codewords that can fit in the next frame. Therefore, the frame batcher 212 again searches through the remaining messages in the next frame buffer 2008 for the longest message. That message is the third message "C" 2212, which is fifty codewords long. The frame batcher 212 then moves this message 2212 to the delay message buffer 2010.

At this point, the total number of codewords remaining in the next frame buffer 2008 is forty which is less than the maximum 87 that can be transmitted in the frame. The frame batcher 212 determines that a portion of each of the two messages being delayed 2212, 2214, can be transmitted in the next frame. The frame batcher 212 creates a first message packet for message "D" 2214 in the next frame buffer 2008 by combining the address codeword, the vector codeword, the first data codeword and one message data codeword for the particular message 2214. This first message packet "D1" 2216 is four codewords long and is inserted into the next frame buffer 2008 right after the second message "B" 2210. A second message packet "D2" 2220 for the particular message 2214 remains stored in the delay message buffer 2010. This second message packet 2220 also includes an address codeword, a vector codeword, and a first data codeword. At this point, the next frame buffer 2008 contains forty-four codewords and message "C" 2212 can be divided up into two message packets to fill the remainder of the next frame as shown in the second step 2204.

The corresponding first message packet "C1" 2218 includes forty-three codewords, and the second corresponding message packet "C2" 2222 includes ten codewords which remain in the delay message buffer 2010. This message packet 2222 also includes an address codeword, a vector codeword, and a first data codeword. Here, the frame batcher 212 has organized a full frame of message information in the next frame buffer 2008 which is then coupled to the next frame message buffer 216 for subsequent processing and transmission.

In processing the following frame, the frame batcher 212 recovers a new message "E" 2224 from the active page file 210 and stores it in the next frame buffer 2008 as shown in the third step 2206. This message 2224 includes twenty-two codewords which in combination with the fifty-nine codewords from the second message packet "D2" 2220 of the fourth message "D" 2214, and the second message packet "C2" 2222 with ten remaining code words of the third message "C" 2212 would exceed the eighty-seven maximum codewords per frame. Therefore, the frame batcher 212 searches the next frame buffer 2008 for the largest message stored there, and removes it from the next frame buffer 2008.

This leaves the new message 2224 and the second packet 2222 of the third message 2212, which totals thirty-two codewords. Because the frame can accept up to eighty-seven codewords, the frame batcher 212 then fragments the second message packet "D2" 2220 into a third and a fourth message packet as shown in the third step 2206. The third message packet "D3" 2226 of the fourth message "D" 2214 is sufficient to fill the eighty-seven codewords of the next frame. The remaining message information is organized as a fourth message packet "D4" 2228 for the fourth message 2214 in the delay message buffer 2010. This fourth message packet 2228 also includes an address codeword, a vector codeword, and a first data codeword with control information therein.

At this point, the frame batcher 212 can transfer the one frames worth of message information from the next frame buffer 2008 to the next frame message buffer 216 for further processing and transmission. The fourth message packet 2228 (composed of seven code words) of the fourth message 2214 remains in the delay message buffer 2010 and may be processed by the frame batcher 212 into the following frame. In this slightly more complicated example, the general operation of the frame batcher 212 may be better appreciated.

In a separate aspect of the present invention, each fragmented message that is stored in the delay message buffer 2010 may be assigned a predetermined frame selection pattern. This may be predetermined in the subscriber database 208 for each of the communication receivers 106. The predetermined frame selection pattern is a mechanism that can extend the battery life of the particular communication receiver 106 and can redistribute message traffic over underutilized frames in the communication protocol.

Specifically, the communication receiver 106 can be coordinated with the terminal 102 to receive message packets from a fragmented message by searching in every one of N frames after the start of the fragmented transmission. For example, the communication receiver can expect after receiving the first message packet of a fragmented message to only look at every third frame for subsequent message packets of the fragmented message. In this way, the communication receiver need only turn on its receiver portion during every third frame while looking for successive message packets of the fragmented message. This affords the communication receiver 106 the capability to conserve power during the other two frames of that cycle by not turning on the receiver portion of the communication receiver 106 when not necessary.

The frame batcher 212 can get the predetermined frame selection pattern with the message information recovered from the active page file 210. This predetermined frame selection pattern can be stored in the subscriber database 208 along with the other information for the particular communication receiver 106. Once the frame batcher 212 determines that a message is to be fragmented into smaller message packets, the message packets stored in the delay message buffer 2010 are assigned its respective predetermined frame selection pattern which also corresponds to a parameter configured in the code memory 822 in the communication receiver 106. Therefore, the paging terminal 102 and the communication receiver 106 are coordinated to only transmit respective message packets and only receive the respective message packets in every one of N frames, as indicated by the predetermined frame selection pattern. For example, the predetermined frame selection pattern may indicate that only every third frame can be considered for the particular communication receiver for transmitting message packets of a fragmented message. Hence, the terminal will keep track of the message packets residing in the delay message buffer 2010 for each successive frame.

For each of the message packet in the delayed message buffer 215 the frame batcher 212 may count down the corresponding predetermined frame selection pattern until it reaches zero, for example. When the counter reaches zero for the particular message packet in the delay message buffer 2010, the frame batcher 212 then attempts to include a particular message packet in the next frame. If it can fit the message packet or a portion thereof in the next frame then the frame batcher 212 will do so. However, if traffic is so heavy that not even a portion of the message packet in the delay message buffer 2010 can be included in the next frame then the frame batcher 212 will not include the message packet in the next frame, and in either case on the count down to zero will reset the counter to the starting value which is the predetermined frame selection pattern for the corresponding communication receiver 106.

In a variation to this aspect of the present invention, the frame batcher 212 may assign a frame selection pattern to the communication receiver 106 as indicated within the first data codeword of the first message packet of the fragmented message. An optional information field in the first data codeword, e.g., a frame assignment field 1709, can indicate to the communication receiver 106 what the current frame selection pattern it is to follow. The terminal 102, in this variation, can adjust the frame selection pattern of transmissions and of the communication receivers 106 to accommodate changes in communication traffic. So in very heavy traffic conditions, the frame batcher 212 may instruct the communication receiver 106 to a long frame selection pattern. While in a lightly loaded traffic condition, the frame batcher 212 may instruct the communication receiver 106 to a short frame selection pattern. This technique may allow the terminal 102 to better manage the traffic loads from frame to frame during varying traffic conditions. Additionally, it can extend the battery life in the communication receiver 106 because the communication receiver 106 does not have to remain on for all subsequent frames, but only one in every N frames.

Figure 23:
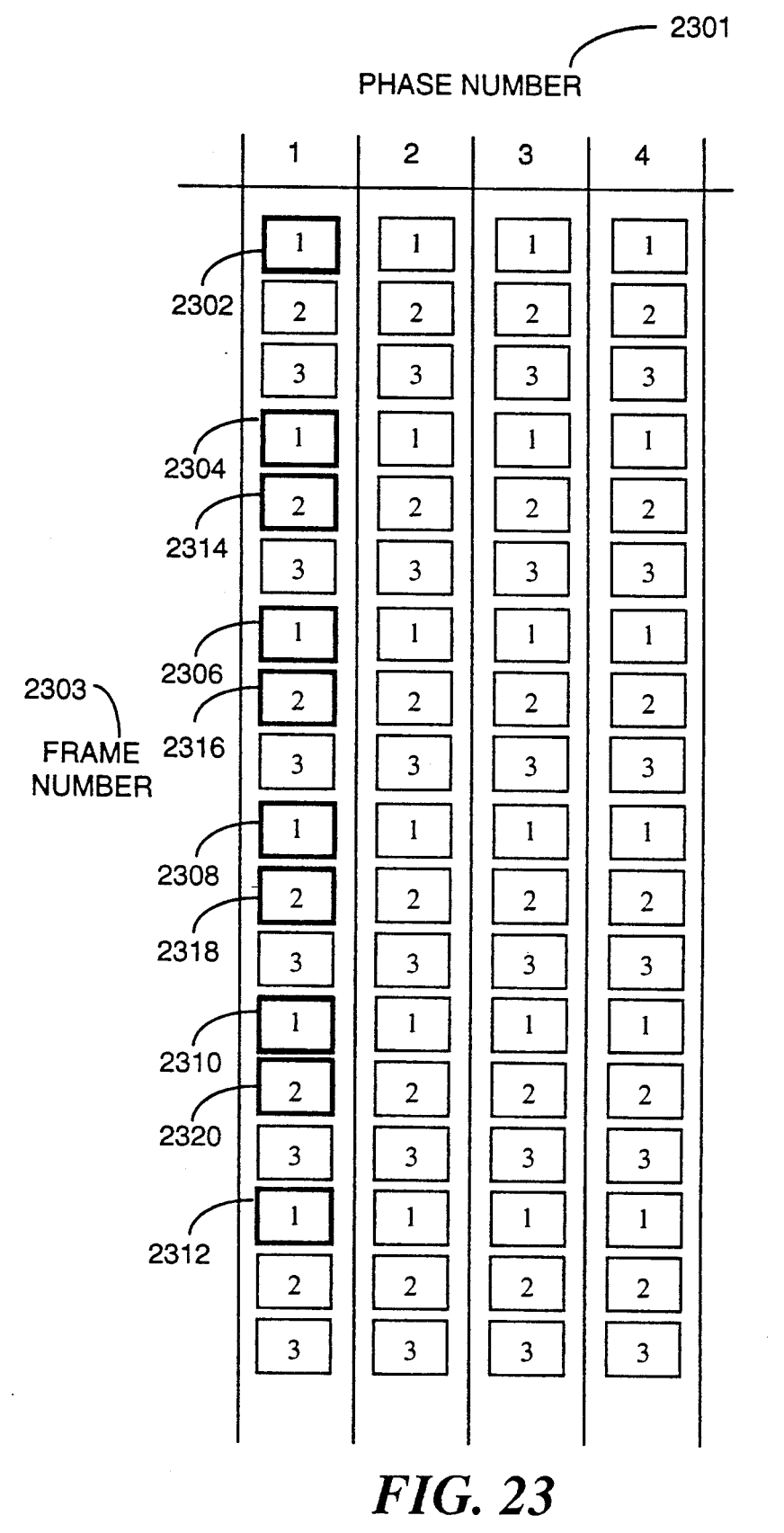

An example is shown in FIG. 23, where a communication protocol for the communication system 100 may include four phases 2301 having a frame transmission cycle of three frames 2303. That is, for each of four phases, three frames, e.g., numbered 1 to 3, cycle repeatedly in the communication protocol. A communication receiver 106, in this example, is assigned to phase one and to frame one 2302, 2304, 2306, 2308, 2310, 2312, for receiving messages from the terminal 102. After receiving a first message packet in frame one 2304, the communication receiver 106 can be assigned to receive subsequent message packets for the message in an alternative frame such as frame two 2314, 2316, 2318, 2320, for completely receiving the transmitted message. As discussed earlier, the terminal 102 can dynamically assign the frame selection pattern for the communication receiver 106, or it can be a predetermined parameter. In this way, frame one is not over crowded with long messages which are diverted to frame two, and the communication receiver 106 can conserve battery power during those frames which it is not assigned to receive messages.

Figure 24:
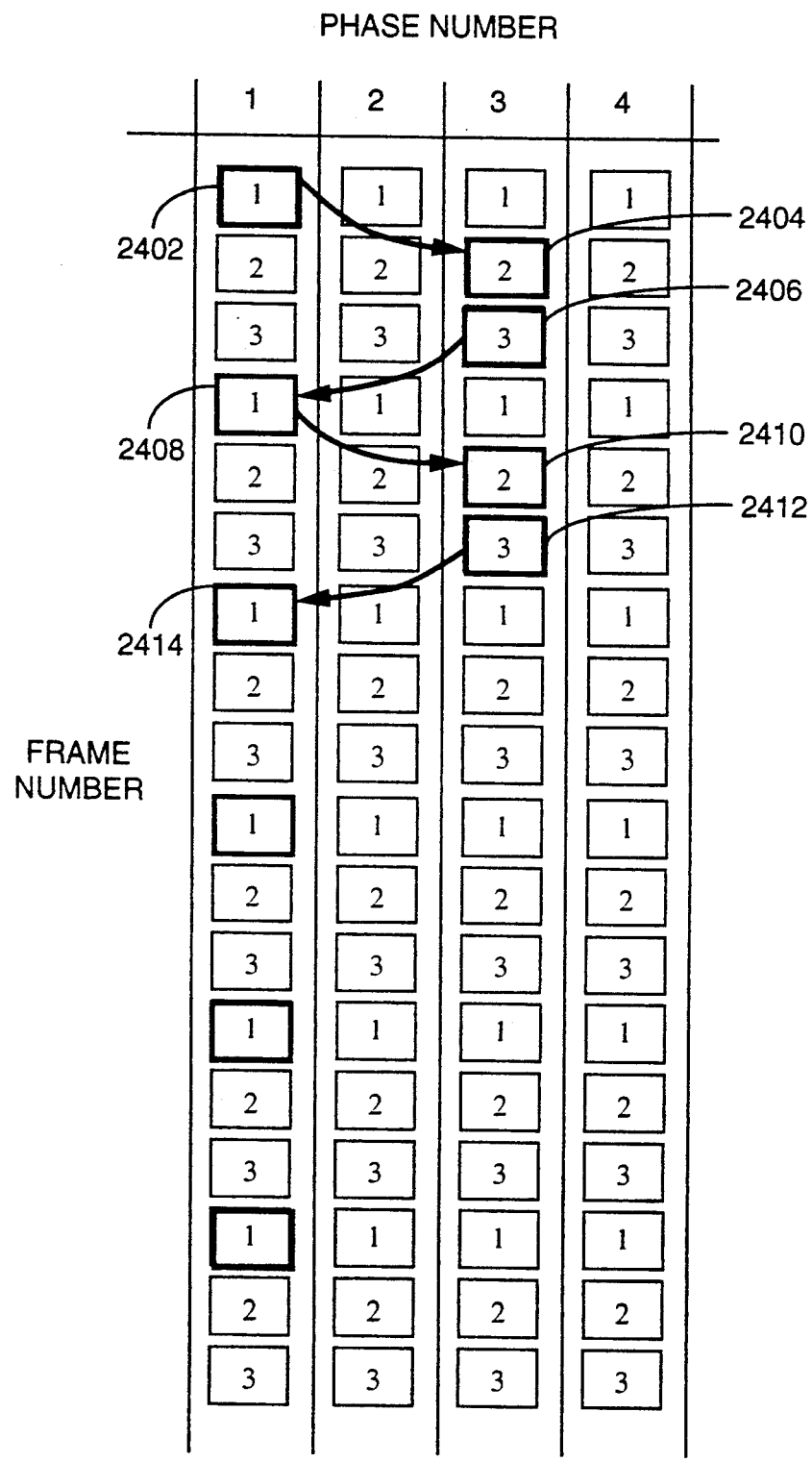
Figure 25:
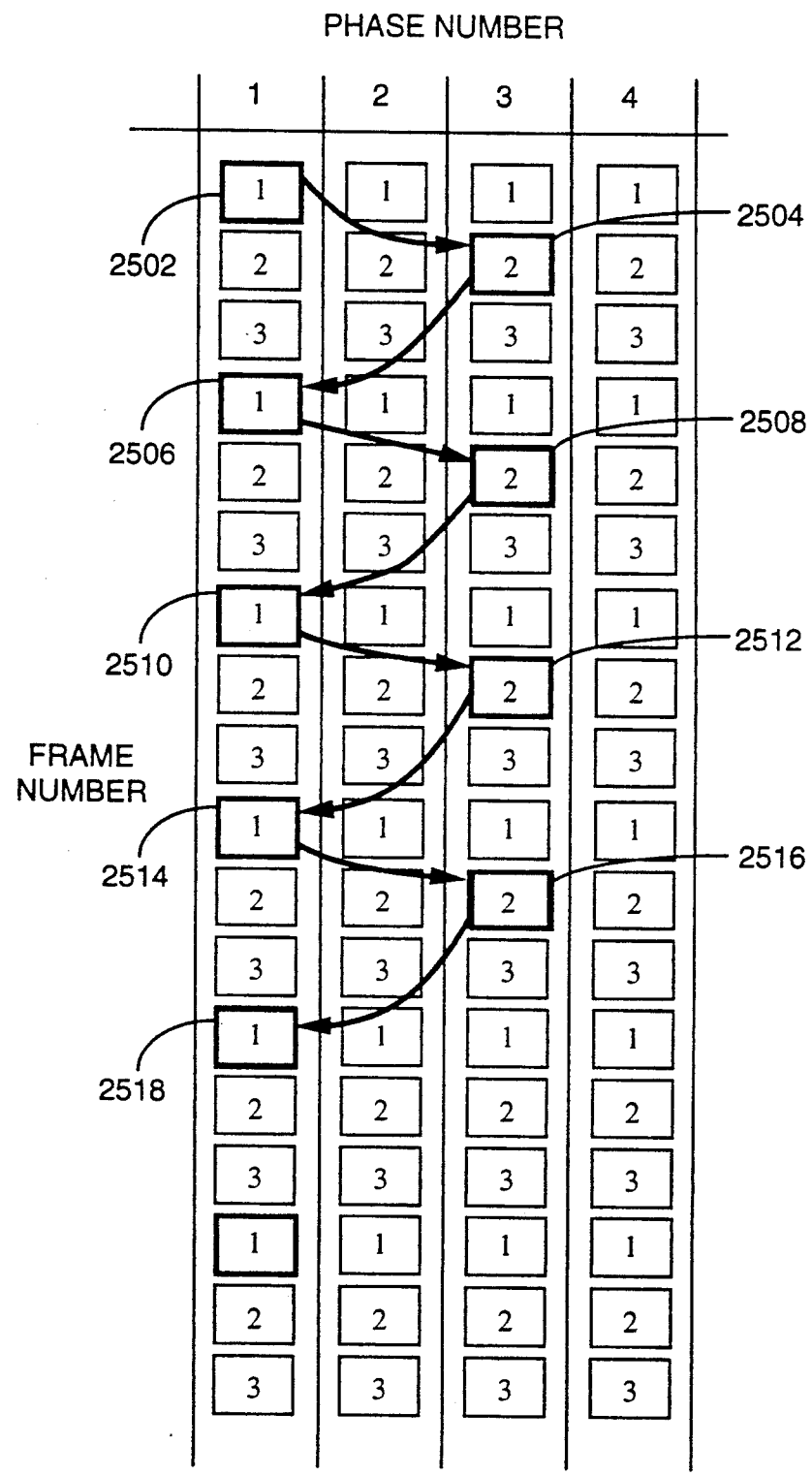

FIGS. 24 and 25 illustrate a different aspect of the present invention, where the message fragments can be transmitted from the terminal 102 to the communication receiver 106 over alternative phases in a multiphase communication protocol. For example, as shown in FIG. 24, the communication receiver 106 can be assigned to receive messages in frame one of phase one 2402, 2408, 2414. Long messages can be transmitted in fragments in the frames located, for example, in phase three. Hence, the communication receiver 106 would search for messages in its assigned frame one 2402 in phase one and when a long fragmented message would be detected by the first message fragment being received in frame one 2402 of phase one, then the communication receiver 106 would shift to phase three for monitoring to receive subsequent message fragments of the long message in the other frames 2404, 2406, 2410, 2412. The communication receiver 106 would return to its assigned frame one 2408, 2414, in phase one during every transmission cycle for receiving other messages while completing to receive the long fragmented message from phase three. In this way, the communication system 100 can dedicate a phase, e.g., phase three, for delivering long messages to the communication receivers. This will free up the other phases, e.g., phase one, for communicating other normal "personal" messages.

In this example, the communication receiver 106 can be assigned to search all frames in phase three other than frame one which it normally searches in phase one. Hence, a long fragmented message can be delivered efficiently over consecutive frames 2404, 2406, 2410, 2412, in phase three while allowing the communication receiver 106 to switch back to its assigned frame one in phase one for receiving other messages.

Alternatively, as shown in FIG. 25, the communication receiver 106 can be assigned to monitor frames in phase three in a frame selection pattern 2504, 2508, 2512, 2516. The terminal 102 can dynamically instruct the communication receiver 106 to follow a frame selection pattern through the frame assignment field 1709 in an alternative phase, e.g., phase three, as indicated in the phase assignment field 1708. In this way, the communication receiver 106 monitors frame one 2502, 2506, 2510, 2514, 2518, in phase one as its default assignment for receiving normal "personal" messages, and then switches to a frame selection pattern 2504, 2508, 2512, 2516, in phase three for receiving message fragments of a long transmitted message. This adds the advantage that the communication receiver 106 can conserve power to extend battery life while receiving messages.

Figure 26:
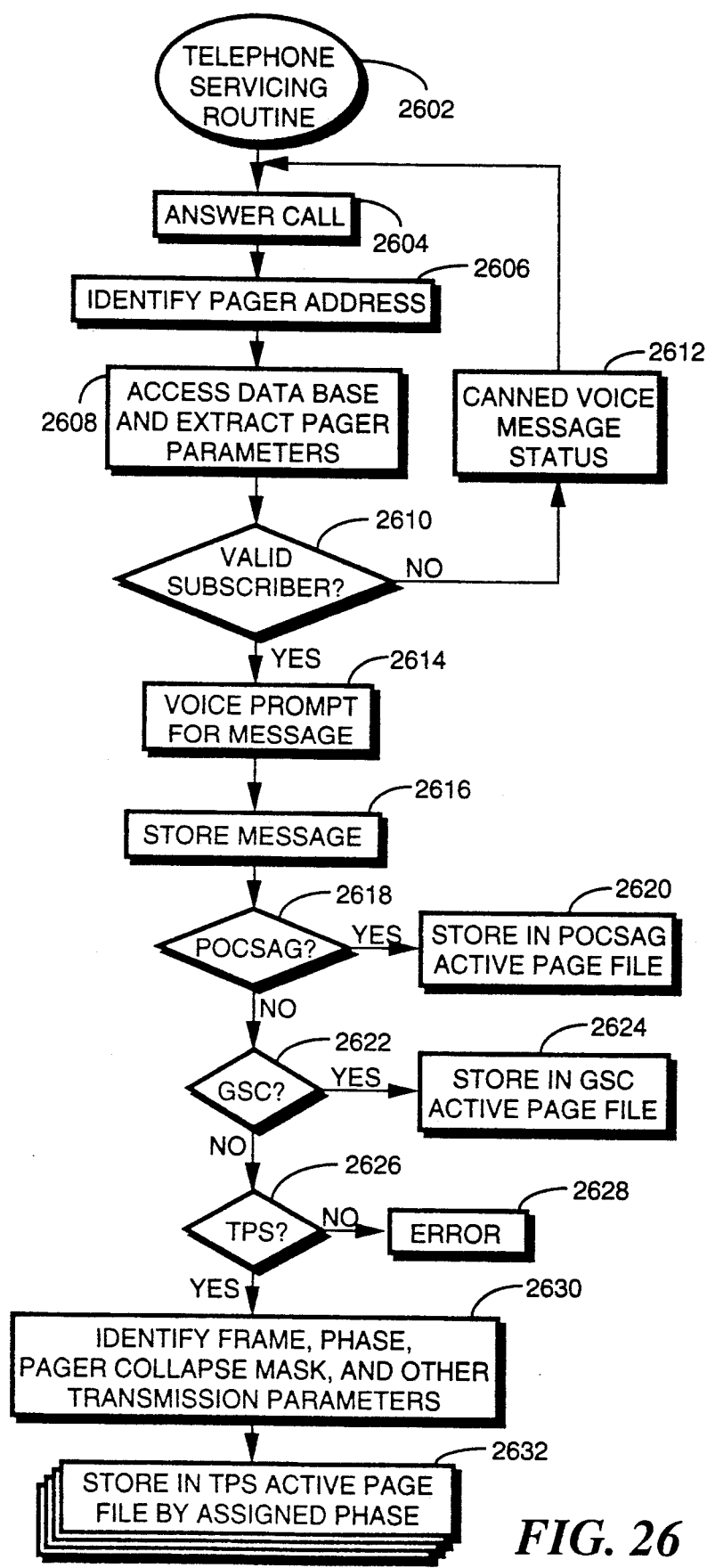
FIGS. 26, 27, 28, 29 and 30, respectively, comprise three flow charts illustrating operational sequences for the terminal of FIG. 2, according to the preferred embodiment of the present invention.

FIG. 26 is a flowchart showing an operational sequence for the terminal 102 in accordance with the preferred embodiment of the present invention. The terminal 102 services 2602 an incoming call, at step 2604, by answering the telephone and receiving a page request from a caller or calling device. Then, at step 2606, the terminal 102 identifies a pager address for a communication receiver as destination for a message indicated by the page request. In the subscriber database 208, the terminal 102 can access all the pager parameters associated with the identified pager address, at step 2608. The controller 204, at step 2610, can determine if the requested page is for a valid subscriber. If not, the terminal 102 can terminate the call, at step 2612, such as by providing a termination message to the caller and then disconnecting the telephone line. If the pager request is to a valid subscriber, at step 2610, then the terminal 102 can prompt for a message, at step 2614, and then store the message, at step 2616.

The terminal 102, at steps 2618, 2622, 2626, verifies the protocol for delivering the message to their communication receiver. For example, if a POCSAG (Post Office Code Standardization Advisory Group) protocol is selected by the page request then the controller 204, at step 2620, stores the message and the associated parameters in the POCSAG active page file. If the selected protocol is GSC (Golay Sequential Coding) then the controller 204, at step 2624, stores the message and the associated pager parameters in the GSC active page file. Alternatively, at step 2626, if the selected protocol is a time slot protocol (TSP) then the controller 204, at step 2630, identifies the assigned frame, the assigned phase, and other transmission parameters for the requested page and, at step 2632, stores the message with the associated parameters for the requested page in the TSP active page file by assigned phase. That is, in this protocol, messages are stored in the active page file 210 organized by their assigned phase.

Figure 27:
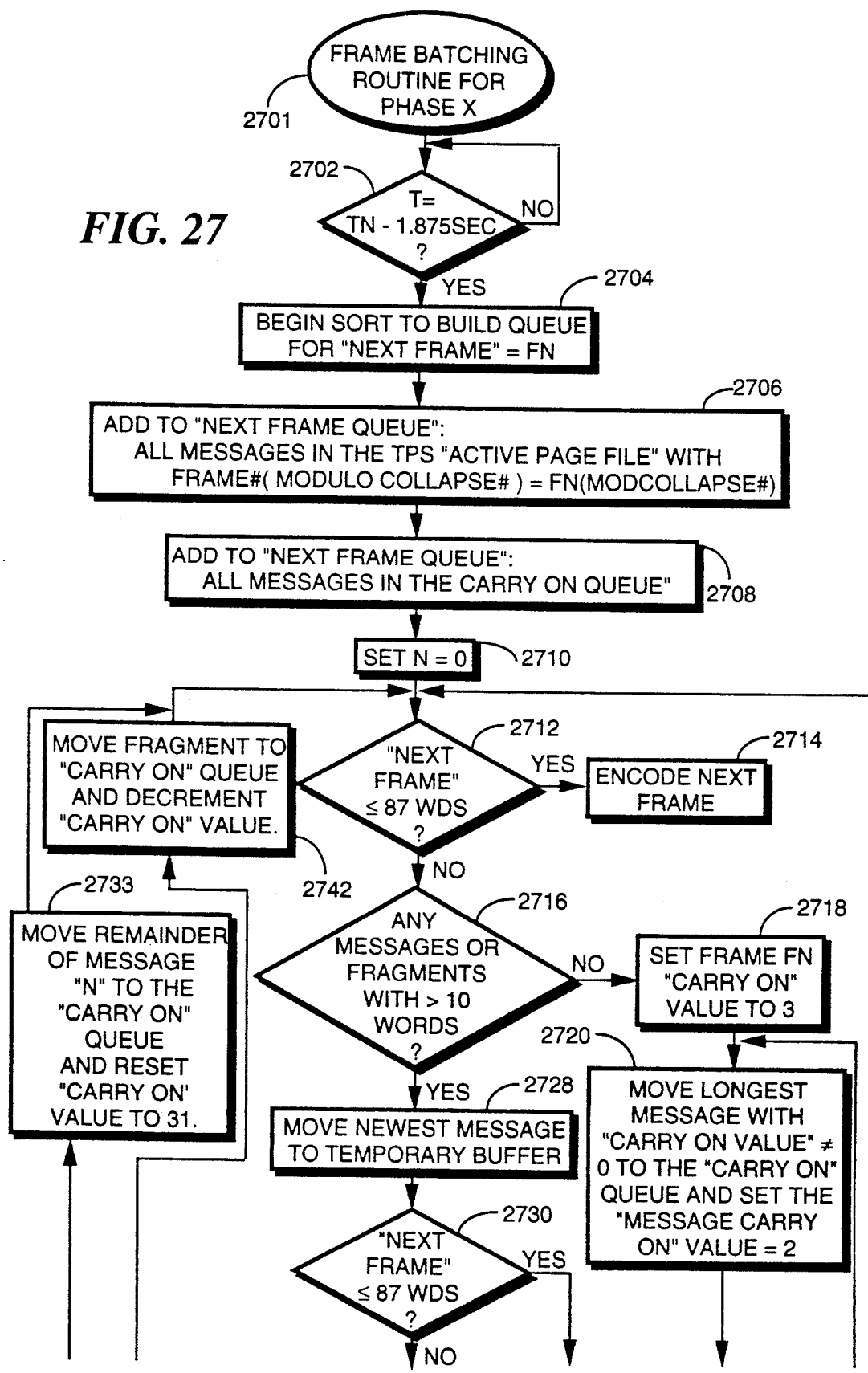
Figure 28:
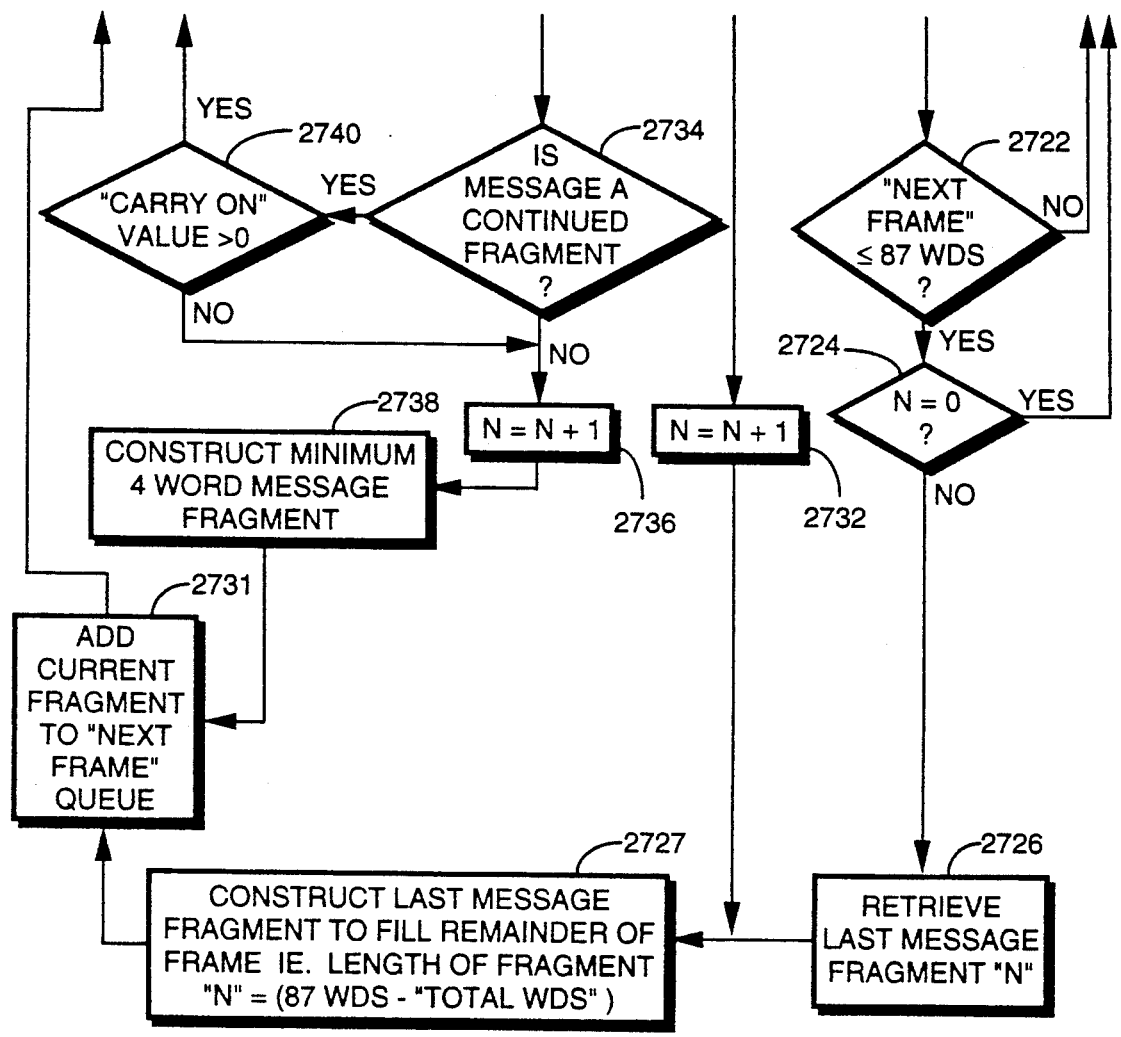

As shown in FIGS. 27 and 28, the paging terminal 102 can follow an operational sequence for transmitting the message to the communication receiver according to the preferred embodiment of the present invention. Specifically, the frame batcher 212 follows the routine, at step 2701, for transferring messages from the active page file 210 to the frame message buffer 216 for transmitting messages in the next frame.

At every frame transmission cycle, at step 2702, the frame batcher 212 begins to sort messages to build the next frame buffer 2008 with the messages for transmitting into the next frame. The frame batcher 212, at step 2706, gets all the messages in the active page file 210 that are assigned to the next frame, and transfers them to the next frame buffer 2008, as discussed earlier. Further, at step 2708, the frame batcher 212 gets all the messages in the delay message buffer 2010 and transfers them to the next frame buffer 2008. Hence, at this point all the messages for transmission in the next frame are located in the next frame buffer 2008. The frame batcher 212 can then decide which messages or portion of messages will be transmitted in the next frame, as discussed below.

Next, the frame batcher 2012, at step 2710 sets the next frame counter initially to zero, also as discussed earlier. If all the code words for transmission fit in the next frame, at step 2712, the frame batcher 212 then transfers, at step 2714, the messages in the next frame buffer 2008 to the frame message buffer 216 for encoding the messages and then transmitting them to the communication receivers. If, on the other hand, all the messages for transmission in the next frame exceed the capacity of the next frame, at step 2712, then the frame batcher 212 determines what messages, or portions of messages, will be transmitted in the next frame.

The frame batcher 212 determines, at step 2716, whether there are any long messages or long message fragments in the next frame buffer 2008 for transmission in the next frame. In this example, messages or message fragments that are greater than 10 codewords are considered to be long and are candidates for message fragmentation. This criteria defines short messages to include all numeric and alpha messages with less than 21 characters in the messages.

If there are no long messages then the frame batcher 212 sets, at step 2718, the next frame carry on value to 3. The frame batcher 212 then selects the longest message in the next frame buffer having a message carry-on value not equal to zero and then transfers the message to the delay message buffer 2010 and sets the message carry-on value to 2, at step 2720. Next, the frame batcher 212 verifies, at step 2722, whether the capacity of the next frame is still exceeded by the number of codewords in the next frame buffer 2008. As long as it is exceeded, the frame batcher continues to move the longest message from the next frame buffer 2008 to the delay message buffer 2010, at steps 2720 and 2722. A frame counter is utilized by the frame batcher 212 to keep track of the number of message fragments to be transmitted in the next frame. If the next frame counter equals zero, at step 2724, then there are no message fragments in the next frame buffer 2008 and the frame batcher 212 can then transfer, at steps 2712 and 2714, the contents of the next frame buffer 2008 to the frame message buffer 216 for transmitting the next frame. On the other hand, if the next frame counter 2012 does not equal zero, at step 2724, then the frame batcher 212 retrieves the last message fragment, at step 2726.

Subsequently, the frame batcher 212 constructs a last message fragment to fill the remainder of the frame, at step 2727, which is equivalent to the maximum capacity of the frame, e.g., 87 words, less the number of words already stored in the next frame buffer 2008. Finally, the frame batcher 212 adds the message fragment, at step 2731, to the next frame buffer 2008, and then moves the remainder of the message, at step 2733, to the delay message buffer 2010 and resets the message carry-on value to a maximum delay, e.g., 31. Subsequently, the frame batcher 212, at steps 2712 and 2714, transfers the messages from the next frame buffer 2008 to the frame message buffer 216 for encoding the messages and transmitting them to the communication receivers.

If the frame batcher 212 determines, at step 2716, that there are long messages in the next frame buffer 2008 which are overflowing the capacity of the next frame then the frame batcher 212 moves the newest message, at step 2728, to a temporary buffer, and, at step 2730, determines whether the remaining words in the next frame buffer 2008 are within the capacity of the next frame, at step 2730. If the capacity of the next frame is met, at step 2730, the frame batcher 212 increments the next frame counter, at step 2732, and then constructs, at step 2727, a last message fragment to fill the remainder of the frame. Subsequently, the frame batcher 212 adds the message fragment to the next frame buffer 2008, at step 2731, and then moves the remainder of the message, at step 2733, to the delay message buffer 2010 and resets the message carry-on value to 31. Subsequently, the frame batcher 212 at steps 2712, and 2714, transfers the contents of the next frame buffer 2008 to the frame message buffer 216 for encoding and transmitting the messages in the next frame.

If after moving the newest message to a temporary buffer, at step 2728, the contents of the next frame buffer 2008 still exceeds the maximum capacity of the next frame, at step 2730, then the frame batcher 212 verifies, at step 2734, if the newest message is a continued message fragment. If it is not a continued message fragment, then this will be the first message fragment of a fragmented message and the frame batcher 212, at step 2736, increments the next frame counter, and then constructs, at step 2738, a minimum four word message fragment for representing the first message fragment of a fragmented message. Next, the frame batcher 212 adds the message fragment to the next frame buffer 2008, at step 2731, and then moves the remainder of the message, at step 2733, to the delay message buffer 2010 and resets the message carry-on value to 31.

The frame batcher 212, at step 2734, determines that the message is a continued message fragment then it checks the message carry-on value, at step 2740, to determine if it has reached zero. A message carry-on value of zero indicates that the message fragment has been delayed a maximum amount of time and deserves a high priority for transmission to the communication receiver. Hence, if the message fragments carry-on value is equal to zero, at step 2740, then a message fragment will be transmitted to the communication receiver, at steps 2736, 2738, 2731, 2733, 2712, and 2714. If the message fragment has a message carry-on value that is greater than zero, at step 2740, the frame batcher 212 can move the fragment to the delay message buffer 2010 and then decrement the message carry-on value accordingly at step 2742. This indicates that the message fragment has been delayed one more frame transmission cycle. Subsequently, the frame batcher 212 transfers the contents of the next frame buffer to the frame message buffer 216, at steps 2712 and 2714. In this way, the frame batcher 212 operates to transmit as many messages or message fragments as can fit in the next frame.

Figure 29:
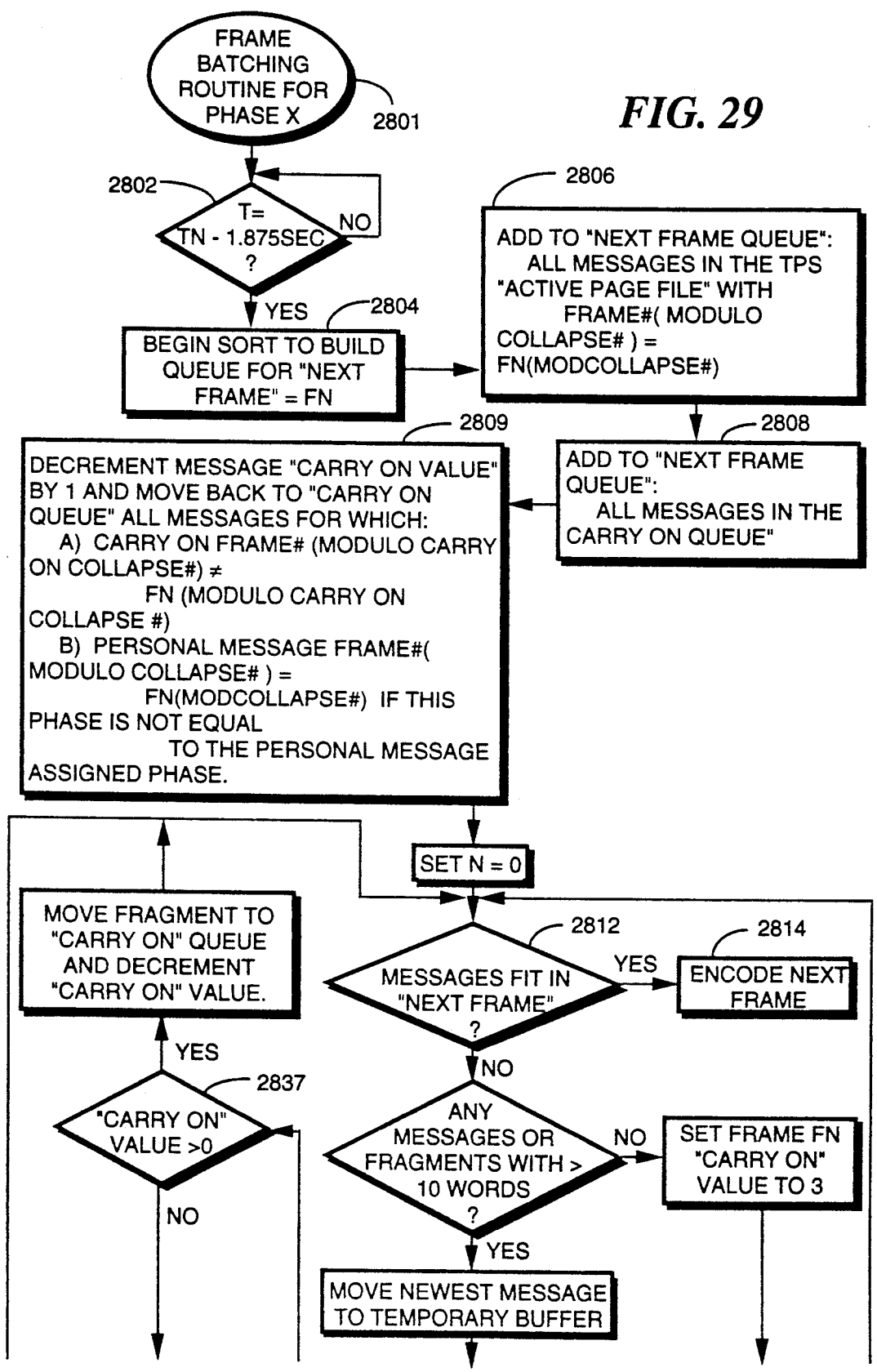
Figure 30:
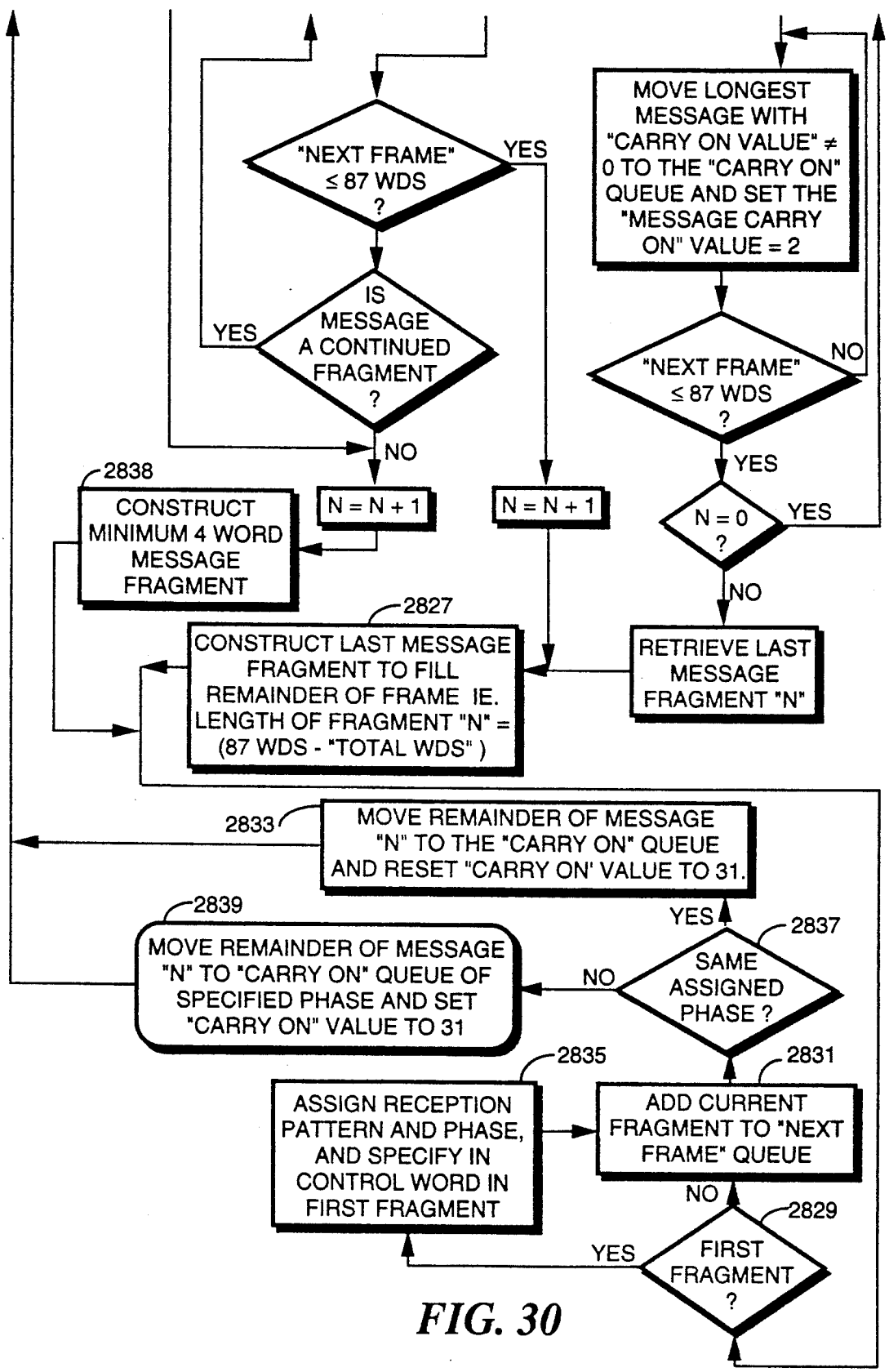

FIGS. 29 and 30 illustrate a slightly modified operational sequence for the frame batcher 212 with respect to the operational sequence shown in FIGS. 27 and 28. Here, the frame batcher can assign alternative phases and select frame patterns for fragmented messages being transmitted to communication receivers. The main differences are discussed below.

After the frame batcher 212 fills the next frame buffer 2008 with the messages and message fragments, at steps 2806 and 2808, the frame batcher 212, at step 2809, moves all messages and message fragments that are not assigned to the current frame for transmission in this phase. Further, their message carry-on value is decremented by one to indicate their delay by one frame transmission cycle. In this way, the frame batcher 212 keeps track of not just frame information but also phase information for determining which messages or message fragments can be transmitted in the current frame. Another difference occurs when transmitting the very first message fragment, at step 2829, where the frame batcher 212 must determine, at step 2835, the frame pattern and the phase for delivering subsequent message fragments to the communication receiver.

Once the frame batcher 212 assigns the frame pattern and the phase to the fragmented message in its first fragment, at step 2835, the frame batcher 212 can add the first message fragment to the next frame buffer 2008, at step 2831, and then if subsequent message fragments are to be received in a different phase at step 2837, the frame batcher 212 moves, at step 2839, the remainder of the message to the delay message buffer 2010 at the specified phase and further sets the message carry-on value to 31. Then, the frame batcher 212 can transfer the contents of the next frame buffer 2008 to the frame message buffer 216, at steps 2812 and 2814, for encoding and transmitting the messages to the communication receivers. In this way, the frame batcher 212 can distribute message fragments over multiple frames and multiple phases in the communication protocol to efficiently utilize the available channel in the delivering messages and message fragments to the communication receivers.

Figure 31:
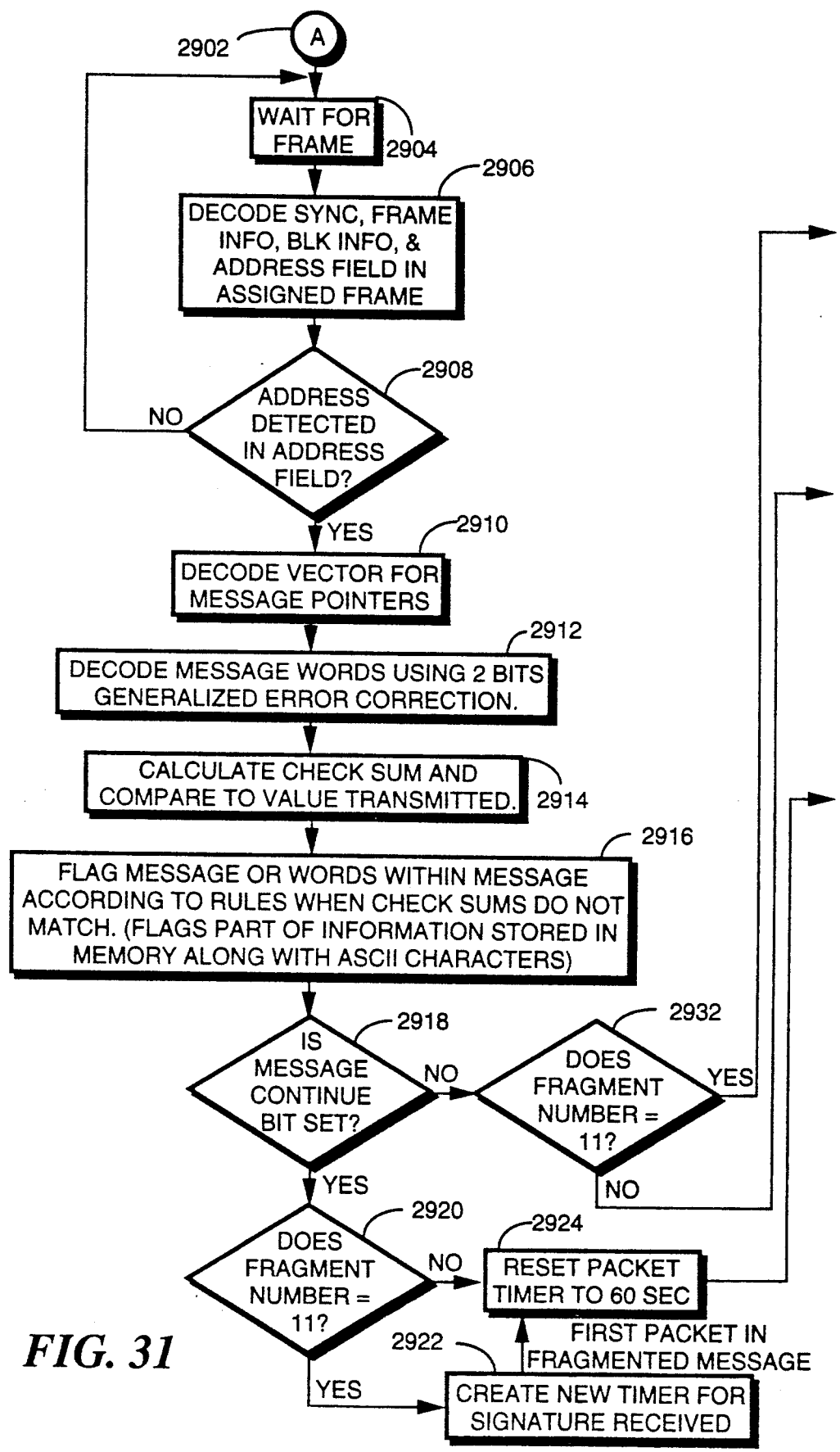
FIGS. 31 and 32 comprise a flow chart illustrating an operational sequence for the data communication receiver of FIG. 8, in accordance with the preferred embodiment of the present invention.
Figure 32:
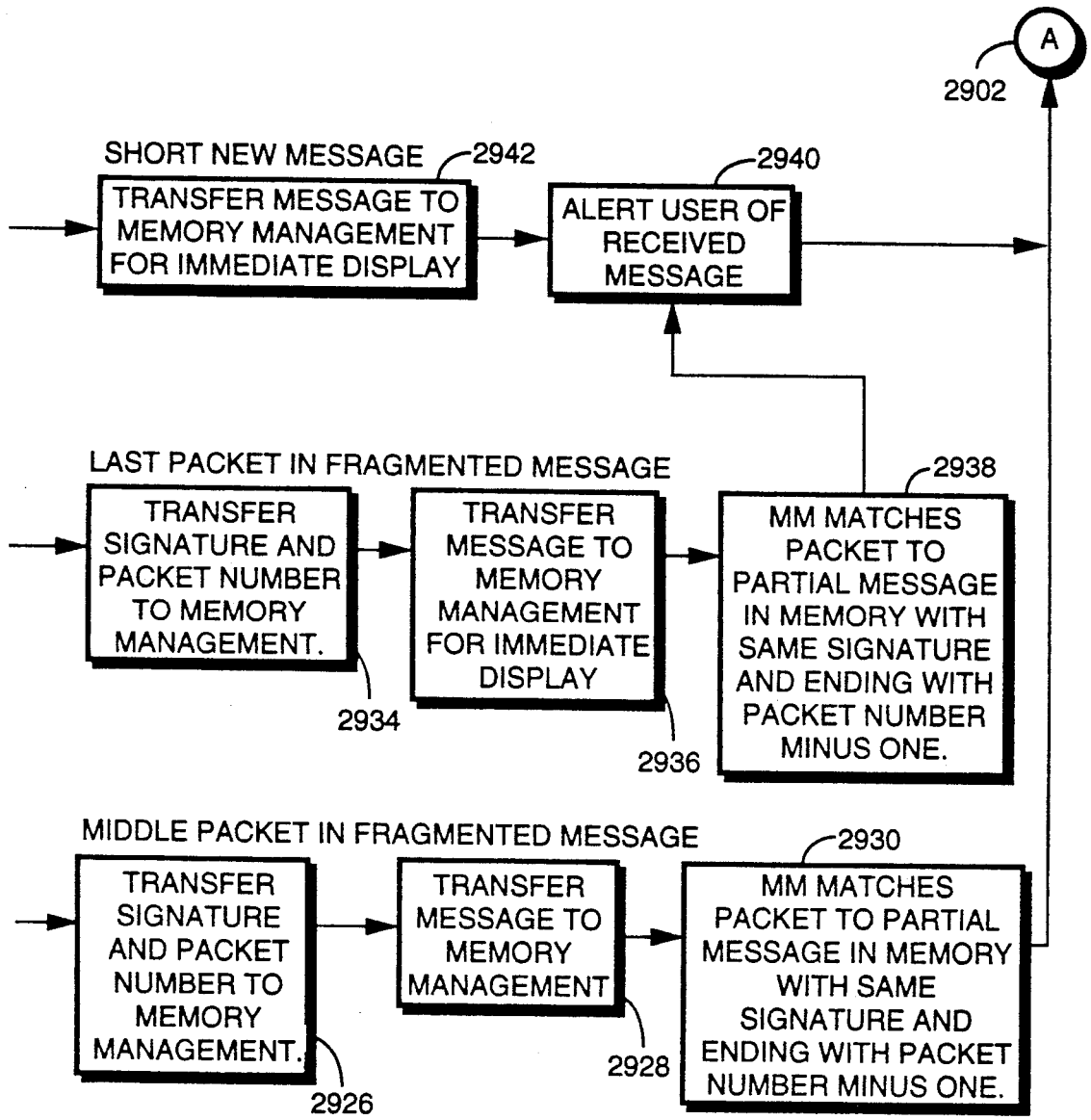

FIGS. 31 and 32 comprise flow charts illustrating an operational sequence for the communication receiver 106 (FIG. 8), in accordance with the preferred embodiment of the present invention. After the communication receiver 106 has conserved power during a power conservation interval 2902, 2904, the communication receiver 106 synchronizes to the current frame and address field within the frame 2906, and searches through the address field correlating 2908 each address in the address field with one or more predetermined addresses in the communication receiver 106. If an address successfully correlates 2908 with one of the one or more predetermined addresses in the communication receiver 106 then the communication receiver 106 decodes the vector codeword 2910 corresponding to the successfully correlated address codeword. Then the communication receiver 106 performs error correction 2912 on each of the one or more data codewords in the message. Optionally, the communication receiver 106 can calculate a checksum 2914 over the range of decodes data codewords and compared to a transmitted checksum value 2916 to determine a transmission error. The communication receiver 106 can then flag errors in messages which can then be processed accordingly in presentation to a user of the communication receiver. For example, errors in messages can be replaced by a specific character which would be displayed to the user to indicate an error during reception.

The communication receiver 106 checks the continue flag of a received message packet 2918, and then compares the packet number to the value "11" 2920 to determine if this is a start of a new fragmented message. If it is a new start, a new timer is created 2922 which keeps track of the maximum allowed time between receiving message packets of a fragmented message. The timer is then set to 60 seconds 2924, for example, to prevent the communication receiver 106 from remaining turned on for greater than 60 seconds while waiting for a subsequent message packet of a fragmented message.

The communication receiver 106 saves the signature and the packet number as parameters for the message in memory 2926 and then transfers 2928 the data portion of the message to message memory 850. Optionally, The controller 816 utilizes the signature and the packet number to match 2930 the received message packet with any previously received message packets that are stored in the message memory. These message packets are stored in the message memory 850 for reconstructing the fragmented message when all the message fragments have been received. The communication receiver 106 then continues 2902 searching for other transmitted messages at the next occurrence of an assigned frame 2904.

If the continue flag is not set 2918, then this indicates either that this is the very last packet in a fragmented message 2932, 2934, 2936, 2938, or that it is only a message packet of a short message 2932, 2942. In either of these cases the communication receiver 106 acknowledges receipt of a complete message by generating an alert signal and providing an alert 2940 to the user to indicate that a message has been completely received. Again, the communication receiver 106 can continue 2902 performing other functions or searching for other transmitted messages at the next occurrence of an assigned frame 2904. Therefore, the communication receiver 106 is capable of receiving fragmented messages which comprise one or more message packets over multiple frames.

Optionally, the communication receiver 106 may, after detecting reception of a first message packet, at step 2920, switch to monitoring a predetermined pattern of subsequent frames, or an alternative assigned phase, or both, at step 2904, for receiving subsequent message packets transmitted over the communication channel for the fragmented message having its first message packet detected at step 2920. This aspect of the communication protocol and the operation of the communication receiver 106 has been discussed above. The advantages of this alternative operation of the communication system, such as conserving power and extending battery life at the communication receiver 106, have also been discussed above.

The longer messages can be transmitted in smaller message packets thereby allowing more even distribution of communication traffic, and preventing very long messages from frustrating the required traffic flow of other potentially more important messages, such as emergency messages. Hence, the communication receiver 106 receiving the longer messages may be slightly penalized in time delay for receiving the entire fragmented message, while allowing the other communication traffic to efficiently flow in the communication channel and more fairly share the available channel capacity and available resources.

Thus, the communication protocol for the distributed communication system discussed above allows fragmented message transmission. By reducing the longer messages into a sequence of successive smaller message packets the distributed communication system can better handle the varying traffic loads while allowing the longer messages.

What is claimed is:

1. A method for decoding a transmitted fragmented message in a selective call receiver, the fragmented message comprising one or more message packets, each of the one or more message packets comprising an address and message data, the message data comprising an indication of whether more message packets are to be received for the fragmented message, the method comprising the steps of:
   (a) receiving an address of each message packet of one or more message packets of a fragmented message;
   (b) correlating the address to one or more predetermined addresses;
   (c) decoding the message data of each message packet in response to a successful correlation of the address in step (b); and
   (d) successively storing the decoded message data of each message packet of the one or more message packets to reconstruct the fragmented message, the fragmented message being completely reconstructed after detection in the decoded message data of one of the one or more message packets an indication that no more message packets are to be received for the fragmented message.

2. The method of claim 1, wherein the message data of each of the one or more message packets comprises a signature identifying each of the one or more message packets as being associated with the fragmented message, the method further comprising the steps of:
   (e) detecting the signature in the decoded message data of each of the one or more message packets of the fragmented message to identifying the association of each of the one or more message packets; and
   (f) storing the decoded message data of each of the one or more message packets associated by the signature for reconstructing the fragmented message identified by the signature.

3. The method of claim 1, further comprising the step of:
   (g) monitoring frames in a time slot communication protocol following a predetermined frame selection pattern for receiving the one or more message packets of the fragmented message during at least one of the monitored frames.

4. The method of claim 3, further comprising the step of:
   (h) monitoring frames in a time slot communication protocol following a predetermined frame selection pattern in an assigned phase for receiving the one or more message packets of the fragmented message during at least one of the monitored frames in the assigned phase.

5. The method of claim 1, wherein the message data of each of the one or more message packets comprises an indication of message packet sequence in the fragmented message, the method further comprising the step of:
   (i) detecting a start of a new fragmented message by detecting in the decoded message data of a message packet of the one or more message packets of the fragmented message an indication of a first message packet in the message packet sequence of the fragmented message.

6. The method of claim 5, wherein the fragmented message comprises a plurality of message packets capable of being transmitted over a communication channel in a plurality of frames in a communication protocol, the method after step (i) further comprising the steps of:
   (j) detecting in the message data of the first message packet a frame selection pattern for selecting frames in the communication protocol following the frame selection pattern; and
   (k) monitoring at least one subsequent frame following the frame selection pattern for receiving one or more subsequent message packets of the plurality of message packets composing the fragmented message.

7. The method of claim 6, further comprising the step of:
   (l) receiving the one or more subsequent message packets transmitted in at least one of the subsequent frames monitored following the frame selection pattern.

8. The method of claim 5, wherein the fragmented message comprises a plurality of message packets capable of being transmitted over a communication channel in a plurality of frames in a plurality of phases in a communication protocol, the method after step (i) further comprising the steps of:
   (m) detecting in the message data of the first message packet a frame selection pattern for selecting frames in the communication protocol following the frame selection pattern;
   (n) detecting in the message data of the first message packet a phase assignment for selecting the frames following the frame selection pattern in an assigned phase; and
   (o) monitoring at least one subsequent frame following the frame selection pattern in the assigned phase for receiving the one or more subsequent message packets of the plurality of message packets composing the fragmented message.

9. The method of claim 8, further comprising the step of:

(p) receiving the one or more subsequent message packets transmitted in at least one of the subsequent frames monitored following the frame selection pattern in the assigned phase.

10. A communication system for transmitting fragmented messages to distributed selective call receivers, each fragmented message comprising one or more message packets, each of the one or more message packets comprising an address and message data, the communication system comprising:
a controller for providing one or more message packets of a fragmented message;
at least one transmitter coupled to the controller for transmitting the one or more message packets of a fragmented message; and
at least one selective call receiver for receiving the one or more message packets of the fragmented message, the at least one selective call receiver comprising:
a code plug memory for storing one or more predetermined addresses;
a message memory for storing the message data of one or more message packets of a fragmented message;
a receiver for receiving transmitted messages including the one or more message packets of the fragmented message;
an address correlator coupled to the receiver and the code plug memory for correlating the address of each of the one or more message packets to the one or more predetermined addresses, and for providing an indication of a successful correlation of the address to one of the one or more predetermined addresses; and
a data decoder coupled to the receiver and the address correlator for decoding the message data of each of the one or more message packets in response to the indication of a successful correlation of the address thereof, and for coupling the message data to the message memory, the message data of each of the one or more message packets being successively stored in the message memory for reconstructing the fragmented message, the fragmented message being completely received after detection in the message data of one of the one or more message packets an indication that no more message packets are to be received for the fragmented message.

11. The communication system of claim 10, wherein the message packets of a fragmented message can be transmitted over a communication channel in a plurality of frames in a time slot communication protocol, and wherein the code plug memory of the at least one selective call receiver includes a predetermined frame assignment and a predetermined frame selection pattern, and the at least one selective call receiver further comprising:

frame selection means responsive to the predetermined frame assignment for selecting an assigned frame in the time slot communication protocol for monitoring the assigned frame for receiving the transmitted messages including the one or more message packets of the fragmented message, and
the frame selection means being alternatively responsive to the predetermined frame selection pattern after receiving a first message packet of a plurality of message packets of a fragmented message for selecting frames in the time slot communication protocol following the predetermined frame selection pattern for monitoring the selected frames for receiving at least one message packet of the plurality of message packets transmitted in at least one of the selected frames.

12. The communication system of claim 11, wherein the frame selection means follows the predetermined frame selection pattern after receiving the first message packet of a plurality of message packets of the fragmented message for selecting all subsequent frames in the time slot communication protocol for monitoring all subsequent frames for receiving at least one message packet of the plurality of message packets transmitted in at least one of the subsequent frames.

13. The communication system of claim 11, wherein the at least one selective call receiver includes a timer for providing time information, and the frame selection means is responsive to the time information after receiving the first message packet of a plurality of message packets of the fragmented message for selecting and monitoring all subsequent frames in the time slot communication protocol for a predetermined time interval for receiving at least one message packet of the plurality of message packets transmitted in at least one of the subsequent frames within the predetermined time interval.

14. The communication system of claim 10, wherein the message packets of a fragmented message can be transmitted over a communication channel in a plurality of frames in a communication protocol, the controller further comprising:
a frame batcher for preparing a fragmented message comprising a plurality of message packets for transmission to the at least one selective call receiver, a first message packet of the plurality of message packets including a frame selection pattern for instructing the at least one selective call receiver to select frames in the communication protocol following the frame selection pattern for monitoring the selected frames for receiving at least one subsequent message packet of the plurality of message packets composing the fragmented message; and the at least one selective call receiver further comprising:
a frame selection means responsive to the frame selection pattern in the first message packet for selecting frames in the communication protocol following the frame selection pattern for monitoring the selected frames for receiving at least one subsequent message packet of the plurality of message packets composing the fragmented message.

15. The communication system of claim 10, wherein the message packets of a fragmented message can be transmitted over a communication channel in a plurality of frames in a plurality of phases in a communication protocol, the communication system further comprising:
a frame batcher for preparing a fragmented message comprising a plurality of message packets for transmission to the at least one selective call receiver, a first message packet of the plurality of message packets including a frame selection pattern and a phase assignment for instructing the at least one selective call receiver to select frames in the communication protocol following the frame selection pattern in the phase assigned by the phase assignment for monitoring the selected frames for receiving at least one subsequent message packet of the plurality of message packets composing the fragmented message; and the at least one selective call receiver further comprising:

a frame selection means responsive to the frame selection pattern and the phase assignment in the first message packet for selecting frames in the communication protocol following the frame selection pattern in the phase assigned by the phase assignment for monitoring the selected frames for receiving at least one subsequent message packet of the plurality of message packets composing the fragmented message.

16. A selective call receiver capable of receiving a transmitted fragmented message, the fragmented message comprising one or more message packets, each of the one or more message packets comprising an address and message data, the message data comprising an indication of whether more message packets are to be received for the fragmented message, the selective call receiver comprising:

a code plug memory for storing one or more predetermined addresses;

a message memory for storing the message data of one or more message packets of a fragmented message;

a receiver for receiving transmitted messages including the one or more message packets of the fragmented message;

an address correlator coupled to the receiver and the code plug memory for correlating the address of each of the one or more message packets to the one or more predetermined addresses, and for providing an indication of a successful correlation of the address to one of the one or more predetermined addresses; and a data decoder coupled to the receiver and the address correlator for decoding the message data of each of the one or more message packets in response to the indication of a successful correlation of the address thereof, and for coupling the message data to the message memory, the message data of each of the one or more message packets being successively stored in the message memory for reconstructing the fragmented message, the fragmented message being completely received after detection in the message data of one of the one or more message packets an indication that no more message packets are to be received for the fragmented message.

17. The selective call receiver of claim 16, wherein the message packets of a fragmented message can be transmitted over a communication channel in a plurality of frames in a time slot communication protocol, and wherein the code plug memory includes a predetermined frame assignment and a predetermined frame selection pattern, and the selective call receiver further comprising:

frame selection means coupled to the code plug memory and responsive to the predetermined frame assignment for selecting an assigned frame in the time slot communication protocol for monitoring the assigned frame for receiving the one or more message packets of the fragmented message, and the frame selection means being alternatively responsive to the predetermined frame selection pattern after receiving a first message packet of a plurality of message packets of a fragmented message for selecting frames in the time slot communication protocol following the predetermined frame selection pattern for monitoring the selected frames for receiving at least one message packet of the plurality of message packets transmitted in at least one of the selected frames.

18. The selective call receiver of claim 17, wherein the frame selection means follows the predetermined frame selection pattern after receiving the first message packet of a plurality of message packets of the fragmented message for selecting all subsequent frames in the time slot communication protocol for monitoring all subsequent frames for receiving at least one message packet of the plurality of message packets transmitted in at least one of the subsequent frames.

19. The selective call receiver of claim 16, wherein the message data of each of the one or more message packets comprises an indication of message packet sequence in the fragmented message, and wherein the data decoder detects a start of a new fragmented message after detecting in the message data of a message packet of the one or more message packets of the fragmented message an indication of a first message packet in the message packet sequence of the fragmented message.

20. The selective call receiver of claim 16, wherein the message data of each of the one or more message packets of a fragmented message comprises a signature identifying each of the one or more message packets as being associated with the fragmented message, and wherein the data decoder detects the signature in the message data of each of the one or more message packets and couples the message data to the message memory for reconstructing the fragmented message identified by the signature.

21. The selective call receiver of claim 16, wherein the message data of each of the one or more message packets of the fragmented message comprises a first portion and a second portion, and wherein the first portion includes the indication of whether more message packets are to be received for the fragmented message, the data decoder coupling the second portion of the message data of each of the one or more message packets to the message memory for successively storing the message data of the fragmented message while the indication in the first portion of the message data of each of the one or more message packets indicates that more message packets are to be received for the fragmented message, and the data decoder coupling the second portion of the message data of a final message packet of the one or more message packets constituting a completely received fragmented message after detection in the first portion of the message data of the final message packet an indication that no more message packets are to be received for the fragmented message.

22. The selective call receiver of claim 16, wherein the message data of each of the one or more message packets of the fragmented message is organized in one or more data code words, each data code word comprising a message data portion, and wherein the selective call receiver further comprises an error corrector coupled to the receiver, the address correlator, and the data decoder for correcting up to a predetermined number of bit errors in each of the one or more data code words of a received message packet of the one or more message packets of the fragmented message in response to the indication of a successful correlation of the address of the received message packet, and for providing an indication of a successful or failed correction of each of the one or more data code words, the data decoder being responsive to the indication of a successful correction of each of the one or more data code words of the received message packet for decoding the message data portion of each of the corrected one or more data code words and coupling the message data portion to the message memory for successively storing the message data of the received message packet in the message memory for reconstructing the fragmented message in the message memory.

* * * * *